(12) United States Patent
Rajasekaran et al.

(10) Patent No.: US 12,079,655 B2
(45) Date of Patent: *Sep. 3, 2024

(54) SECURE INCIDENT INVESTIGATION WORKSPACE GENERATION AND INVESTIGATION CONTROL

(71) Applicant: Microsoft Technology Licensing, LLC, Redmond, WA (US)

(72) Inventors: Yoganand Rajasekaran, Bothell, WA (US); Raquibur Rahman, Redmond, WA (US); Ayla Kol, Sammamish, WA (US); Philip Ross Moyer, Redmond, WA (US); Brijesh Bhupendra Desai, Redmond, WA (US); Zijun Hao, Redmond, WA (US); Mainul Mizan, Redmond, WA (US); Kameshwar Jayaraman, Redmond, WA (US); Benjamin Du, Kenmore, WA (US); Parul Manek, Redmond, WA (US); Ganesh Pandey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,601

(22) Filed: Mar. 7, 2023

(65) Prior Publication Data

US 2023/0205572 A1    Jun. 29, 2023

Related U.S. Application Data

(63) Continuation of application No. 16/523,803, filed on Jul. 26, 2019, now Pat. No. 11,630,684.

(51) Int. Cl.
*G06F 9/455* (2018.01)
*G06F 11/34* (2006.01)
*G06N 20/00* (2019.01)

(52) U.S. Cl.
CPC ...... *G06F 9/45558* (2013.01); *G06F 11/3476* (2013.01); *G06N 20/00* (2019.01);
(Continued)

(58) Field of Classification Search
CPC .. G06F 9/45558; G06F 11/3476; G06N 20/00
See application file for complete search history.

(56) References Cited

U.S. PATENT DOCUMENTS 8,903,943 B2 * 12/2014 Glaser ............... G06F 9/5027
709/217
10,243,959 B1 * 3/2019 Balmakhtar ............ H04L 67/34
(Continued)

FOREIGN PATENT DOCUMENTS

CN         106575253 A     4/2017

OTHER PUBLICATIONS

"Notice of Allowance Issued in U.S. Appl. No. 17/528,328", Mailed Date: Mar. 2, 2023, 5 Pages.
(Continued)

*Primary Examiner* — Oleg Korsak
(74) *Attorney, Agent, or Firm* — RAY QUINNEY & NEBEKER P.C.; Paul N. Taylor

(57) ABSTRACT

A secure investigation platform in a sovereign cloud includes a request processing system that receives requests to investigate an incident. A control message processing system creates a workspace, within the sovereign cloud, so that an investigation can be conducted within that workspace. An investigation pack, which includes investigative resources used in the investigation, is identified and the workspace is pre-configured with the identified investigation pack. The control message processing system performs investigation tasks within the workspace using the investigation pack.

20 Claims, 18 Drawing Sheets

(52) U.S. Cl.
CPC .............. *G06F 2009/45562* (2013.01); *G06F 2009/45587* (2013.01)

(56) References Cited

U.S. PATENT DOCUMENTS

| | | | |
|---|---|---|---|
| 2011/0184982 A1* | 7/2011 | Adamousky | G06F 21/552 |
| | | | 707/769 |
| 2016/0254968 A1 | 9/2016 | Ebtekar et al. | |
| 2016/0275293 A1 | 9/2016 | Yamazaki | |
| 2017/0243004 A1 | 8/2017 | Kinder | |
| 2017/0351716 A1* | 12/2017 | Higginson | G06F 16/285 |
| 2019/0108470 A1 | 4/2019 | Jain | |

OTHER PUBLICATIONS

Bartock, M., et al., "Trusted Cloud: Security Practice Guide for VMware Hybrid Cloud Infrastructure as a Service (IaaS) Environments". NSIT Special Publication 1800-19. Apr. 2022, 202 pages.
Office Action Received for Indian Application No. 202247009957, mailed on Nov. 17, 2023, 7 Pages.
Communication 94(3) Received for European Application No. 20750541.3. (MS#407001-EP01-PCT) mailed on Nov. 27, 2023, 6 pages.
Office Action Received for Chinese Application No. 202080053806.0, mailed on May 29, 2024, 7 pages. (English Translation Provided).
Tao, et al., "A Survey of Fault Detection for Distributed Software Systems with Statistical Monitoring in Cloud Computing", Chinese journal of computers, vol. 40, Issue 2, Feb. 2017, pp. 397-413.

* cited by examiner

SECURE INCIDENT INVESTIGATION WORKSPACE GENERATION AND INVESTIGATION CONTROL

CROSS-REFERENCE TO RELATED APPLICATION

The present application is a continuation of and claims priority of U.S. patent application Ser. No. 16/523,803, filed Jul. 26, 2019, the content of which is hereby incorporated by reference in its entirety.

BACKGROUND

Computer systems are currently in wide use. Many computer systems host services that are accessed, and used, by remote client computing systems. For instance, many computing systems provide cloud-based services in which various software applications are provided, as a service, to customers.

In these types of services, various different types of incidents can occur that are to be investigated so that they can be corrected. For example, a feature or component of the service may be malfunctioning, have a bug, or be otherwise operating in a way that is undesired. Similarly, there may be secure breach-type incidents in which a surreptitious actor gains access, or attempts to gain access, to customer data.

These types of services may be offered across multiple different compliance boundaries. The compliance boundaries define what are sometimes referred to as "sovereign clouds". Different sovereign clouds may be divided along the compliance boundaries. Each of the different sovereign clouds may have different compliance rules or regulations that govern how data, data access, and other secure issues, are to be treated. Data that resides in a sovereign cloud that is geographically located in one region (such as Europe) may be governed by compliance rules regarding digital data that are applied in that region. However, data that resides in a sovereign cloud that is located in another geographic region (such as the United States) may be governed by a different set of compliance rules that are applied in that region. Thus, the two sovereign clouds are said to be divided by a compliance boundary because they are governed by different compliance rules.

For instance, a particular sovereign cloud may have compliance rules that impose certain restrictions on access to production servers in order to limit the exposure or potential exposure of customer data. Other sovereign clouds may have compliance rules or regulations that inhibit the removal of data from that sovereign cloud (e.g., that prohibit data to be moved across a compliance boundary).

The discussion above is merely provided for general background information and is not intended to be used as an aid in determining the scope of the claimed subject matter.

SUMMARY

A secure investigation platform in a sovereign cloud includes a request processing system that receives requests to investigate an incident. A control message processing system creates a workspace, within the sovereign cloud, so that an investigation can be conducted within that workspace. An investigation pack, which includes investigative resources used in the investigation, is identified and the workspace is pre-configured with the identified investigation pack. The control message processing system performs investigation tasks within the workspace using the investigation pack.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, compliance boundaries can make it difficult to investigate different incidents that occur within services offered within the different sovereign clouds defined by those compliance boundaries. For example, it can be difficult to obtain access to production servers, in order to avoid any accidental exposure of customer data. Similarly, moving data out of a sovereign cloud (e.g., across a compliance boundary) for investigation may not be an option, because that may break compliance requirements. This can make troubleshooting any secure or service incident very difficult.

The present discussion thus proceeds with respect to a secure investigation platform in which an investigator can create an ad-hoc investigation workspace within a particular compliance boundary, in which the service is offered. The secure investigation platform includes a request processing system and a control message processing system. The request processing system, may be an investigator (or user) facing system and does not have access to the workspace without going through the control message processing system. The control message processing system manages the workspace and performs tasks within the workspace, based on requests received from the request processing system. The control message processing system cannot be accessed by a user except by receiving control messages from the request processing system. Requests to perform an operation in the workspace can also be authenticated and/or approved, as described below. Thus, the request processing system is isolated from the workspace and the control message processing system is isolated from the user. Data and other functionality or tools can be ingested into the workspace so that the tools can be used to operate on the data to perform various different types of investigative tasks. Data from the workspace is archived into secure log storage, as evidence. Similarly, a machine learning system can access the secure log storage to generate machine learned models that can be used to suggest data and (investigation tools) that may be used in a workspace that is generated to investigate a future incident. These can be pre-loaded into the workspace, once it is created, for the investigator. The machine learning system can also be used to generate a branching logic model that can be used to suggest a next investigation task, when a future investigation is underway in a workspace.

Figure 1:
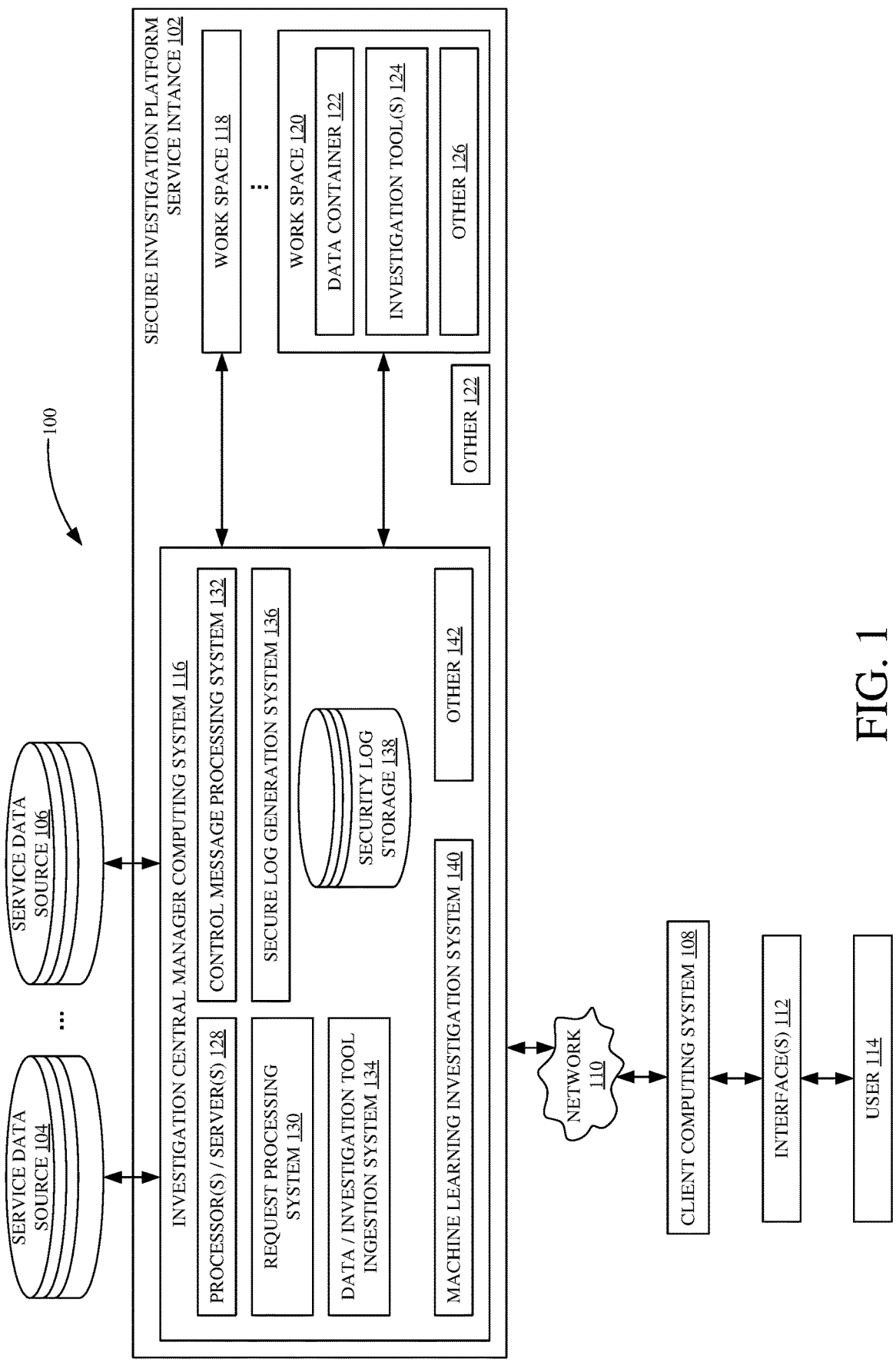
FIG. 1 is a block diagram of one example of a computing system architecture.

FIG. 1 is a block diagram of one example of a computing system architecture 100. Architecture 100 includes secure investigation platform service instance 102 that may have access to service data sources 104-106. In one example, there may be a secure investigations platform service instance 102 deployed within each sovereign cloud so that incidents can be investigated within that sovereign cloud without any data crossing a compliance boundary.

In the example shown in FIG. 1, a client computing system 108 can access secure investigation platform service instance 102 over network 110. Therefore, network 110 can be any of a wide variety of different types of networks, such as a wide area network, a local area network, a near field communication network, a cellular communication network, or any of a wide variety of other networks or combinations of networks.

FIG. 1 also shows that, in one example, client computing system 108 generates interfaces 112 for interaction by user 114. User 114 may be an investigator or other user that wishes to investigate an incident that has occurred in one of the service data sources 104-106. Thus, user 114 can interact with interfaces 112 in order to control computing system 108 and some portions of secure investigation platform service instance 102, so that user 114 can investigate the incident.

In the example shown in FIG. 1, secure investigation platform service instance 102 illustratively includes investigation central manager computing system 116, one or more different workspaces 118-120, and it can include other items 122. User 114 illustratively provides requests to investigation central manager computing system 116 over network 110 indicating that user 114 wishes to investigate an incident. The incident may have been reported by a user of one of the services or it may have been automatically detected, etc. When the request is received, investigation central manager computing system 116 illustratively generates a workspace 120 within the compliance boundaries in which the incident occurred (e.g., in the same sovereign cloud). User 114 can request that data be ingested into workspace 120. It can be stored in a data container 122 in workspace 120. User 114 can also request that investigation tools (or tools) 124 may be ingested into workspace 120 along with any other items 126. User 114 can then provide inputs to investigation central manager computing system 116 indicative of investigative tasks that user 114 wishes to have performed within workspace 120. This may be, for instance, using tools 124 (which can be investigative tools or code, etc.) to operate on data 122 in order to discover characteristics or other information corresponding to the incident that occurred.

In the example shown in FIG. 1, investigation central manager computing system 116 can include one or more processors or servers 128, request processing system 130, control message processing system 132, data/tool ingestion system 134, secure log generation system 136, secure log storage 138, machine learning investigation system 140, and it can include a wide variety of other items 142. Request processing system 130 is illustratively user-facing, in that it receives the request input by user 114 through client computing system 108 and network 110. It provides control messages, based upon the user inputs received, to control message processing system 132. Control message processing system 132 illustratively controls creation of workspaces 118-120, manages the lifecycle of those workspaces, controls ingestion of data and secure logging (using systems 134 and 136, respectively) and operates to perform investigative tasks within the workspaces 118-120, again based on user requests provided from user 114 to request processing system 130. Thus, in one example, request processing system 130 has no access to workspaces 118-120 except by posting control messages to control message processing system 132, and control message processing system 132 is not available for access by user 114 or client computing system 108, except through request processing system 130. This type of isolation enhances secure.

Before describing the overall operation of architecture 100 in more detail, a brief description of some of the items in architecture 100, and their operation, will now be provided. Data/investigation tool (or tool) ingestion system 134 is controlled by control message processing system 132 to retrieve and ingest data and other functionality (such as investigative tools, etc.) into workspaces 118-120. In doing so, data/tool ingestion system 134 may access data from service data sources 104-106 and load it into a temporary data store within data/tool ingestion system 134. The data and/or tools may then be scanned (such as by using a malware scanner or other type of scanning system) to ensure that it does not contain any malware (or other surreptitious logic) before it is ingested into the particular workspace for which it is intended.

Secure log generation system 136 illustratively generates event records indicative of all operations that take place relative to, or within, a workspace. The event record may identify who requested the task, the particular task that was performed, the data that was operated on, the code or logic used to operate on that data, correlations between the task identified in the event record and other tasks performed in the workspace, among a wide variety of other things. Secure log generation system 136 illustratively generates those secure event records and stores them in secure log storage 138. In one example, secure log generation system 136 only adds additional records to secure log storage 138 so that it does not modify or delete any existing records. Thus, the information in secure log storage 138 can be used to perform audit operations or other operations, when needed.

Machine learning investigation system 140 illustratively accesses the information in secure log storage 138 (and it can access other information as well) and performs machine learning based on the accessed information. The machine learning can be used to generate different types of machine learned models that can be used to enhance future investigations. For instance, it can generate an investigation pack model (discussed below) that identifies the different types of data and functionality that were ingested into, and used in, a particular workspace when an incident, that has particular characteristics, was investigated. The investigation pack model can thus generate investigation packs that can be preloaded into a newly created workspace, when a similar incident is to be investigated in the future.

Machine learning investigation system 140 can also be used to generate a machine learned branching logic model (discussed below) that can be used during an investigation within a workspace. For instance, the branching logic model can determine what investigative steps or tasks were performed within a particular workspace when incidents, that have particular characteristics, were investigated within that workspace. It can also determine whether those investigative tasks were successful or useful in identifying or remedying the incident. The branching logic model can then assist an investigator in performing a future investigation, when a similar incident is reported. For instance, when a workspace is created to investigate a similar incident, the branching logic model can suggest a next investigative task or step to perform when investigating that incident.

Figure 2A:
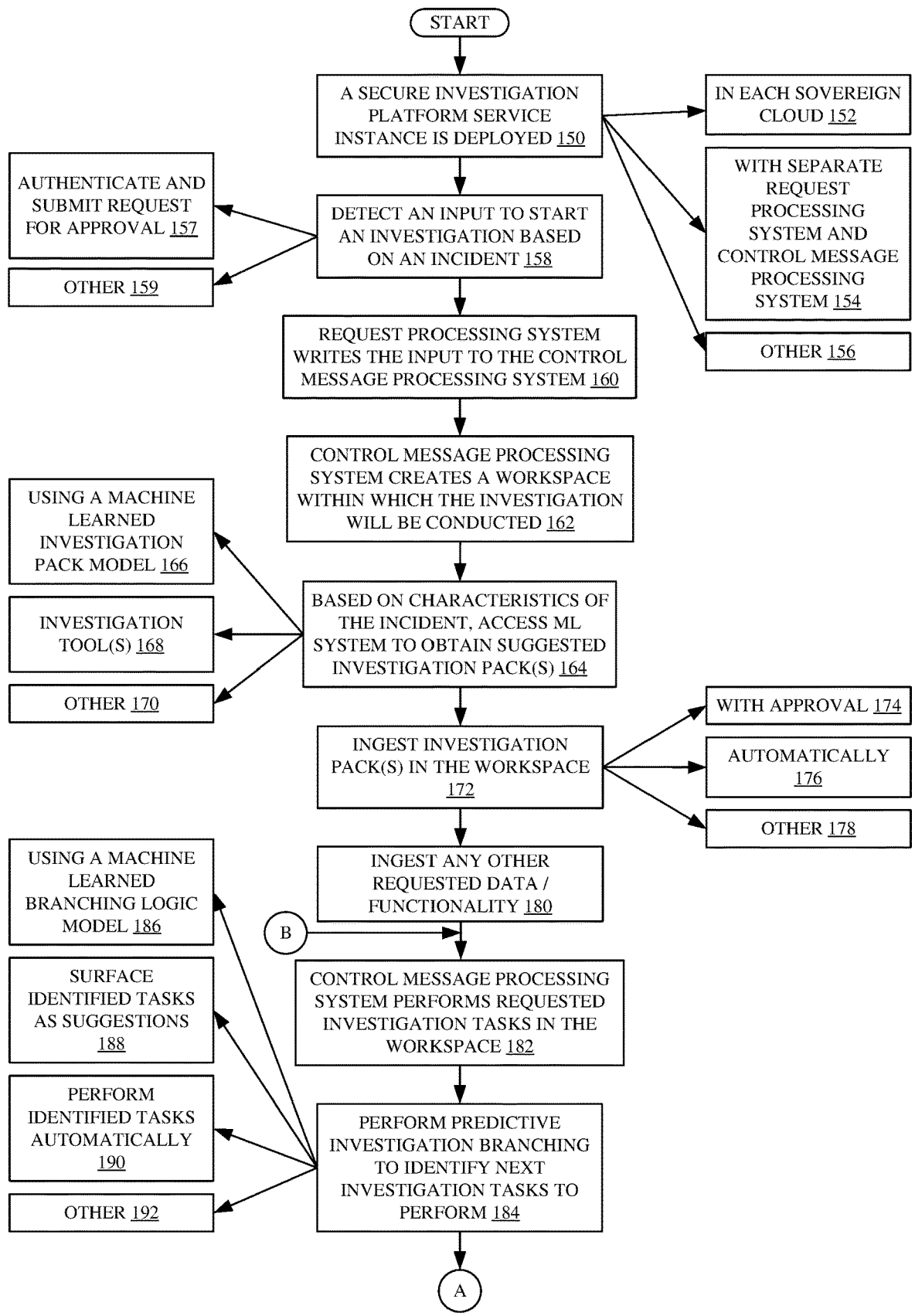
FIGS. 2A and 2B (collectively referred to herein as FIG. 2) show a flow diagram illustrating one example of the operation of the architecture illustrated in FIG. 1.
Figure 2B:
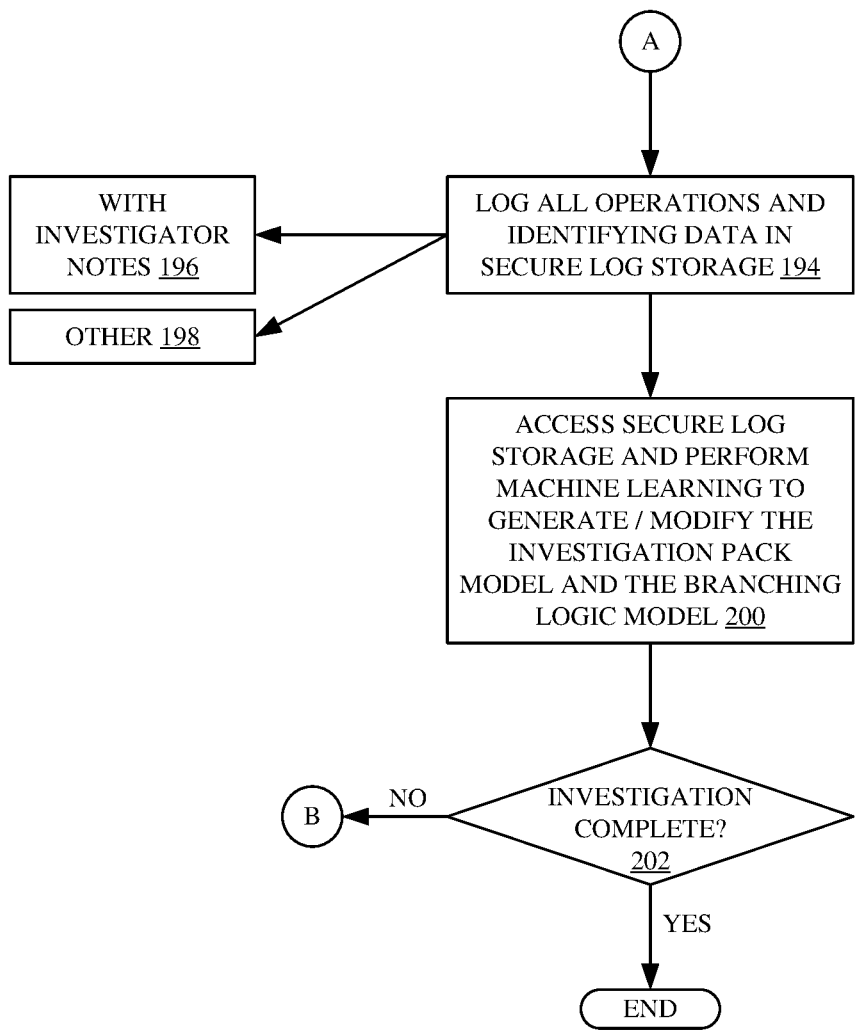

FIGS. 2A and 2B (collectively referred to herein as FIG. 2) show a flow diagram illustrating one example of the overall operation of architecture 100, in more detail. It is first assumed that a secure investigation platform service instance is deployed within the compliance boundary (e.g., on a sovereign cloud) in which a service incident is to be investigated. This is indicated by block 150 in the flow diagram of FIG. 2. As discussed above, in one example, a secure investigation platform service instance is deployed in each sovereign cloud where it is to be used. This is indicated by block 152. It is illustratively deployed with a separate request processing system 130 and control message processing system 132, as discussed above. This is indicated by block 154. It can be deployed in other ways as well, as indicated by block 156.

At some point, request processing system 130 detects an input indicating that user 114 wishes to start an investigation based upon an incident that has been identified. This is indicated by block 158 in the flow diagram of FIG. 2. It can authenticate the input and/or submit it for any desired approvals. This is indicated by block 157. It can process the detected inputs in other ways as well. This is indicated by block 159.

Request processing system 130 then writes a message indicative of that input to the control message processing system 132. This is described in more detail below, and is indicated by block 160 in the flow diagram of FIG. 2. In response, control message processing system 132 creates a workspace (such as workspace 120) within which the investigation will be conducted. It creates that workspace within the compliance boundary where secure investigation platform service instance 102 is deployed as well. Creating the workspace is indicated by block 162 in the flow diagram of FIG. 2.

In one example, control message processing system 132 may access machine learning investigation system 140 to determine whether there are any suggested investigation packs, for this type of incident, that should be preloaded into workspace 120. This is indicated by block 164 in the flow diagram of FIG. 2. It can be done using a machine learned investigation pack model, as briefly described above, and as will be described in greater detail below with respect to FIGS. 10-13. Using a machine learned investigation pack model is indicated by block 166. The model will receive, as inputs, characteristics of the incident to be investigated and output an indication of any pre-existing investigation packs that may be helpful in the investigation.

The suggested investigation pack may identify investigative resources (such as data and/or compute/analytics functionality, such as investigative tools or code) that may be employed by user 114 in performing the investigation. This is indicated by block 168 in FIG. 2. The investigation pack may include other items as well, as indicated by block 170

If there are any suggested investigation packs, they may be ingested by data/tool ingestion system 134, into workspace 120. This is indicated by block 172 in the flow diagram of FIG. 2. In one example, the suggested investigation packs will be surfaced by request processing system 130 for approval by user 114. Once approved, they can be ingested into the workspace 120. Ingestion of the suggested investigation packs with user approval is indicated by block 174. In another example, the suggested investigation packs can be ingested automatically, so that workspace 120 is automatically preconfigured for user 114. This is indicated by block 176. They can be suggested and/or ingested into the workspace in other ways as well, and this is indicated by block 178.

It may also be that, in addition to the data and/or tools that were ingested based upon the suggested investigation packs, user 114 may wish to have other data and/or tools ingested. In that case, user 114 may provide an input to request processing system 130, requesting this. In response, system 130 can write a control message to control message processing system 132 which can, in turn, control ingestion system 134 to ingest the requested data and/or tools. In another example, system 130 writes the control message directly to ingestion system 134. Ingesting any other requested data and/or tools is indicated by block 180 in the flow diagram of FIG. 2.

Once workspace 120 is configured with the desired data, in data container 122, and the desired compute/analytics functionality (or tools) 124, then user 114 may provide inputs to request processing system 130 requesting that certain investigative tasks be performed within workspace 120. For instance, the request may indicate that one of the tools or pieces of functionality 124 is to operate on certain portions of the data in data container 122. This is just one example and other investigative tasks can be performed as well. Using control message processing system 132 to perform investigative tasks within workspace 120 based upon user requests provided to request processing system 130 is indicated by block 182 in the flow diagram of FIG. 2.

As briefly mentioned above (and as is described in greater detail below with respect to FIGS. 10-13) machine learning investigation system 140 may also have a machine learned branching logic model that can be used to assist user 114 in conducting an investigation within workspace 120. The branching logic model receives inputs indicative of the characteristics of the incident being investigated, along with inputs indicative of the particular tasks or steps that have been performed, thus far, in the investigation in workspace 120. It can then perform predictive investigation branching to identify and/or suggest a next investigation task to perform. This is indicated by block 184 in the flow diagram of FIG. 2. Using a machine learned branching logic model to do this is indicated by block 186. Surfacing the identified tasks as suggested tasks for approval by user 114 is indicated by block 188. In another example, those tasks can be performed automatically, and this indicated by block 190. Performing predictive investigative branching can be performed in a wide variety of other ways as well, and this is indicated by block 192.

Secure log generation system 136 also logs all operations and various different types of identifying data (or metadata) that identifies the operations and different characteristics of the operations, in secure log storage 138. Logging these operations is indicated by block 194 in the flow diagram of FIG. 2. This can include logging notes provided by user 114 indicating the results of the investigation and/or the results of individual tasks or steps performed during the investigation. Logging investigator notes is indicated by block 196. Logging operations can be done in a wide variety of other ways, some of which are described in more detail below with respect to FIGS. 8 and 9. This is indicated by block 198 in the flow diagram of FIG. 2.

Also, as briefly discussed above, machine learning investigation system 140 can then access the secure log storage and any other relevant information and perform machine learning to train (generate or update) the investigation pack models and the branching logic model. This is indicated by block 200 in the flow diagram of FIG. 2. In one example, the machine learning is performed after an investigation is complete. In another example, it can be performed during the investigation as well.

Until the investigation is complete, as indicated by block 202, processing may revert to block 182 where the investigator 114 continues to have investigative tasks or steps performed within workspace 120 to continue the investigation. During those steps, additional data or tools may be ingested into workspace 120. Additional information may be logged and/or additional machine learning can be utilized or performed.

Figure 3:
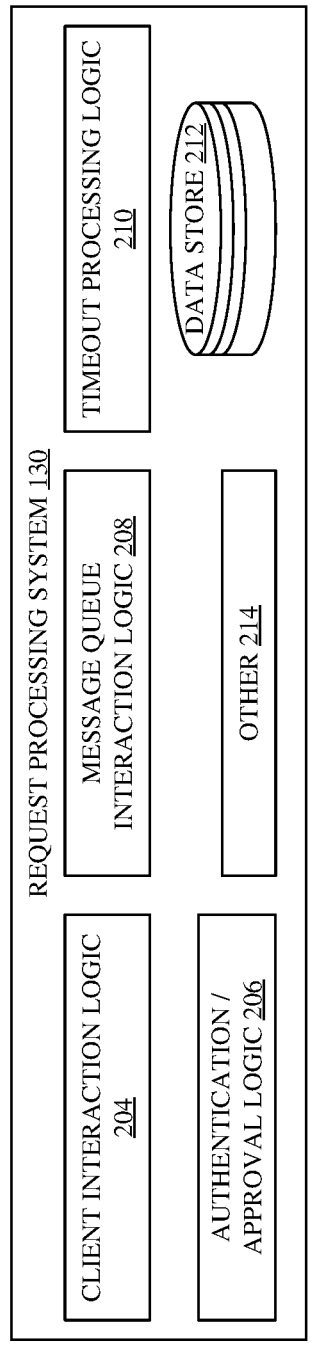
FIG. 3 is a block diagram showing one example of a request processing system in more detail.

FIG. 3 is a block diagram showing one example of request processing system 130, in more detail. In FIG. 3, request processing system 130 illustratively includes client interaction logic 204, authentication/approval logic 206, message queue interaction logic 208, timeout processing logic 210, data store 212, and it can include a wide variety of other items 214. Client interaction logic 204 illustratively detects user inputs from user 114 (provided through client computing system 108) and generates outputs that can be used on interfaces 112 for interaction by user 114. It can detect those user interactions and provide an indication of them to other items in investigation central manager computing system 116.

Authentication/approval logic 206 illustratively authenticates user 114. In doing so, it can determine whether user 114 is authorized to have the access that user 114 is requesting. It can authorize or authenticate both user 114, and the request, in a wide variety of different ways. Similarly, it can submit any requests that are received to any desired approval process before acting on them. The approval processing may be manual, automatic or a combination.

Message queue interaction logic 208 illustratively writes information to a message queue (which will be described in greater detail below) indicative of the user requests that it receives. For instance, a control message will be written to a control message queue when user 114 requests that a workspace be created. The control message will indicate this to control message processing system 132. In another example, a scanning control message may be written to a scanning control message queue (also described below) indicating that user 114 has requested that certain data be ingested into the workspace. In that case, data/functionality ingestion system 134 performs a scanning operation on the data, before it is ingested into the workspace. It does so in response to the scanning message written to the scanning message queue, as described below.

Timeout processing logic 210 can obtain timeout information from control message processing 132 system and provide it when requested by user 114. By way of example, each control message that is written to the control message queue may be accessed by a different instance of control message processing system 132. When it's accessed, a timeout variable may be modified indicating when the control message was accessed. The timeout variable may indicate a certain amount of time that the particular instance of the control message processing system has to perform the task identified in the control message. It can report back information regarding the timeout variable to request processing system 130 where timeout processing logic 210 can surface that information for user 114, when requested.

Data store 212 may be a cache, or other data store that stores information that may be needed by request processing system 130.

Figure 4:
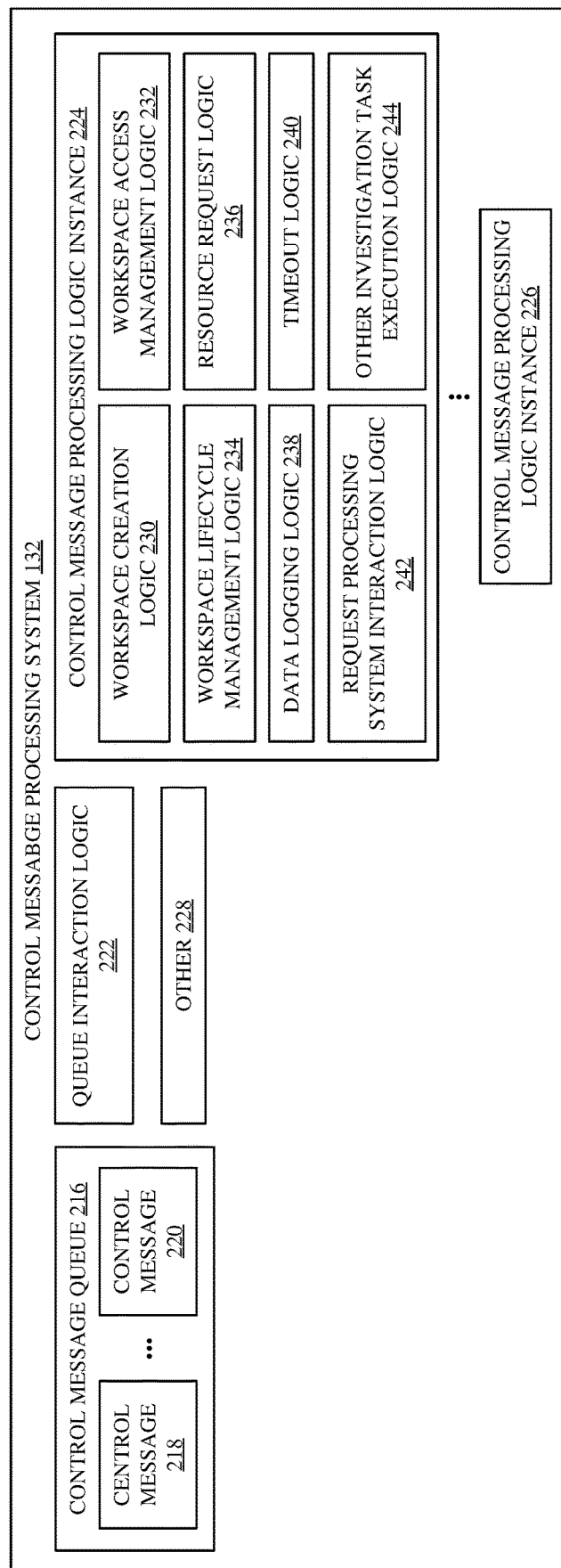
FIG. 4 is a block diagram showing one example of a control message processing system in more detail.

FIG. 4 is a block diagram showing one example of control message processing system 132, in more detail. In the example shown in FIG. 4, control message processing system 132 includes a control message queue 216 which can store control messages 218-220 that are written to it by message queue interaction logic 208 in request processing system 130. Each of the control messages 218-220 may be indicative of a request that was received by client interaction logic 204 in request processing system 130. Each of the control messages 218-220 may thus be indicative of a task or operation to be performed in conducting an investigation within a workspace.

Control message processing system 132 may also include queue interaction logic 222, one or more control message processing logic instances 224-226, and it can include a wide variety of other items 228.

Queue interaction logic 222 illustratively interacts with control message queue 216 to select a next queued message for access by one of the control message processing logic instances 224-226. Each of those instances may obtain control messages from control message queue 216 (using queue interaction logic 222) and begin performing the task or operation identified by (or corresponding to) that control message.

In the example shown in FIG. 4, each control message processing logic instance can include workspace creation logic 230, workspace access management logic 232, workspace lifecycle management system 234, resources request logic 236, data logging logic 238, timeout logic 240, request processing system interaction logic 242, and it can include a wide variety of other investigation task execution logic 244.

Workspace creation logic 230 is illustratively used to create a new workspace (e.g., workspace 120) based upon a control message indicating that a workspace is to be created.

Workspace access management logic 232 illustratively manages access to that workspace. In one example, for instance, a particular workspace may be shared by multiple different users so that they can collaboratively investigate an incident. Those users will have authentication or access information that can be used to authenticate them or authorize them to access the workspace. This can be managed by workspace access management logic 232. Logic 232 can communicate with another authorization or authentication system in doing this, or it can perform these types of management tasks, itself.

Workspace lifecycle management logic 234 illustratively manages the lifecycle of the different workspaces 118-120 that are created. The workspaces may, for instance, have a lifespan that corresponds to the particular investigation that is being conducted. The lifecycle may be limited or determined in other ways as well. When the lifecycle of a particular workspace is expended (as indicated by workspace resource release criteria, such as an investigation being concluded or other criteria), then logic 234 ensures that information from that workspace has been logged by secure log generation system 136, and then releases the computing and data store resources (e.g., processor and memory or other computing and data store resources, such as blob storage, fileshare storage, etc.) used by (or allocated to) that particular workspace so that they can be used in other ways.

Resource request logic 236 determines when resources (such as data and/or compute or analytics functionality or other tools) have been requested for ingestion. It then interacts with data/tool ingestion system 134 to request that those resources be scanned and ingested into the workspace. Data logging logic 238 provides information to secure log generation system 136 so that it can generate secure event records indicative of all the tasks and different operations that are performed within the workspace.

Timeout logic 240 identifies the timeout variable corresponding to a particular control message that the control message processing logic instance 224 is currently working on. It can report back changes in that timeout variable, to request processing system 130, so that the changes can be provided to user 114, when requested.

Request processing system interaction logic 242 illustratively handles different items of interaction between control message processing logic instance 224 and request processing system 130. For instance, it can handle the interaction between timeout logic 240 and timeout processing logic 210 in request processing system 130. It can handle other interactions as well.

The other investigation task execution logic 244 can include a wide variety of different types of logic for executing a wide variety of different types of tasks or steps within a workspace. These may vary based on the incident being investigated, the type of investigation, among other things.

Figure 5:
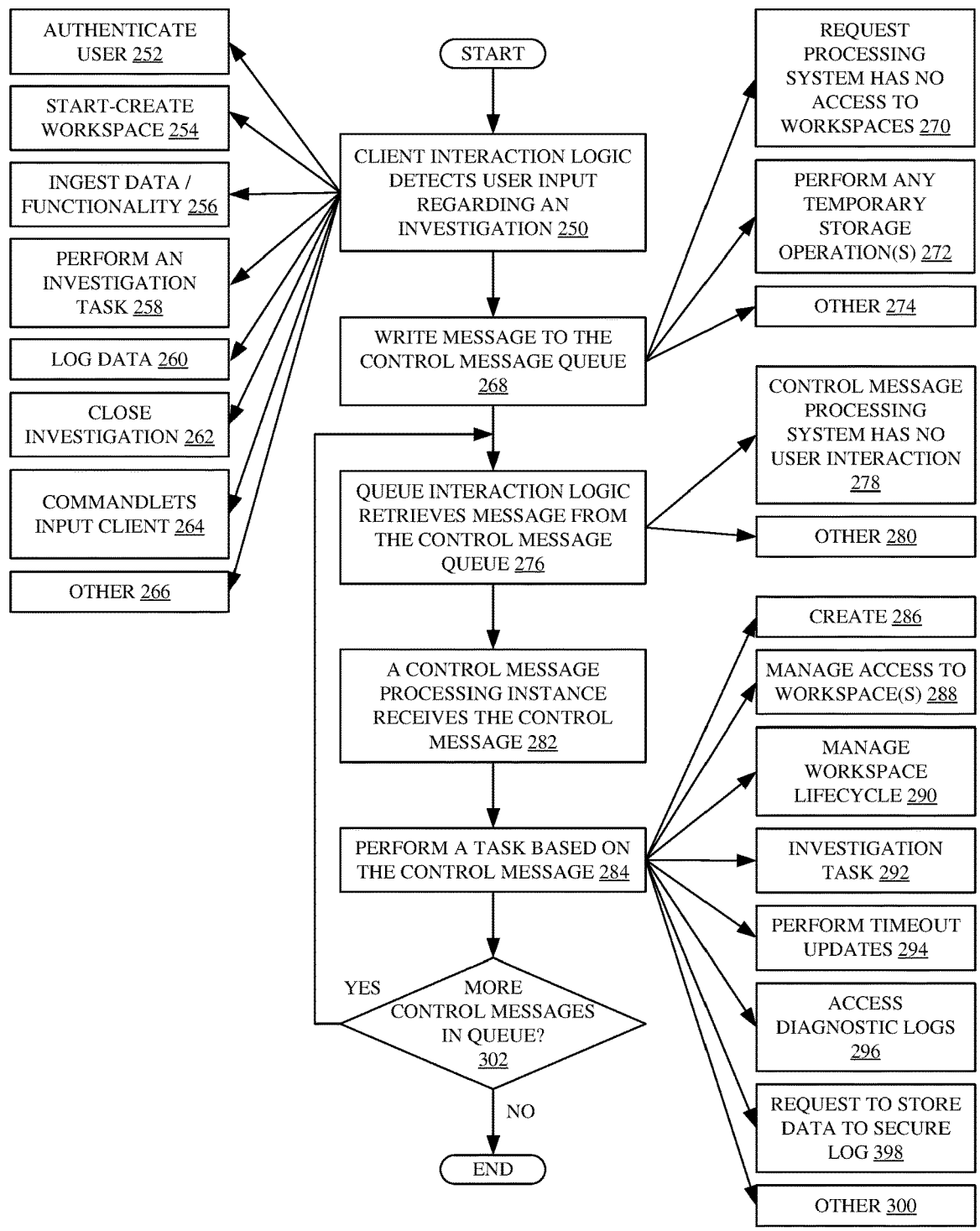
FIG. 5 is a flow diagram illustrating one example of the operation of the request processing system illustrated in FIG. 3 and the control message processing system illustrated in FIG. 4.

FIG. 5 is a flow diagram illustrating one example of how request processing system 130 and control message processing system 132 work to perform requested operations that may be requested by a user 114, within a particular workspace. At some point, client interaction logic 204 will detect a user input regarding a particular investigation. This is indicated by block 250 in the flow diagram of FIG. 5. It may first use authentication logic 206 to authenticate the user, as indicated by block 252. The user input may request that the platform service instance 102 begin an investigation or create a workspace. This is indicated by block 254. The request may be to ingest data or tools into a workspace as indicated by block 256. It may be to perform an investigation task within a workspace as indicated by block 258. It may be to log data to various locations as indicated by block 260, or it may be to close the investigation as indicated by block 262. All of these inputs may be input in the form of command lets that are received from client computing system 108, or they can be input in other forms. This is indicated by block 264. The client interaction logic 204 can detect client inputs in a wide variety of other ways as well, and this is indicated by block 266.

Based upon the detected user input, message queue interaction logic 208 writes a control message to the control message queue 216 in control message processing system 132. This is indicated by block 268. It will again be noted that the request processing system 130 has no direct access to the workspaces 118-120. This is indicated by block 270. Request processing system 130 may also perform any needed temporary storage operations using data store 212. This is indicated by block 272. Request processing system 130 can perform other operations as well, in writing a control message to the control message queue 216. This is indicated by block 274.

Queue interaction logic 222 illustratively listens to control message queue 216 to determine whether any control messages 218-220 have been written there. When this occurs, queue interaction logic 220 retrieves the next control message from the control message queue, as indicated by block 276. Queue interaction logic 222 can retrieve messages from the control message queue 216 in other ways as well. This is indicated by block 280 in the flow diagram of FIG. 5.

A control message processing logic instance 224 then receives the control message from queue interaction logic 222. This is indicated by block 282 in the flow diagram of FIG. 5. Control message processing logic instance 224 then uses its logic to perform a task in the workspace, based upon (or corresponding to) the control message it has received. This is indicated by block 284. Instance 244 can use workspace creation logic 230 to create a workspace as indicated by block 286. Instance 244 can use workspace access management logic 232 to manage access to the workspace, as indicated by block 288. Instance 244 can use workspace lifecycle management logic 234 to manage the lifecycle of the workspace as indicated by block 290. Instance 244 can use any of a wide variety of task execution logic 244 to execute one or more investigation tasks, as indicated by block 292. Instance 244 can use timeout logic 240 to perform timeout updates as indicated by block 294. Instance 244 can use data logging logic 238 to access various diagnostic logs and log that information, as indicated by block 296. Instance 244 can also request to invoke the secure log generation system 136 to store data in the secure log, as indicated by block 298. Instance 244 can perform any of a wide variety of other tasks, based upon the received control message, as indicated by block 300.

So long as there are control messages in the control message queue 216, processing reverts to block 276 where the queue interaction logic 222 obtains a message from the queue and provides it to a control message processing logic instance. This is indicated by block 302 in the flow diagram of FIG. 5.

Figure 6:
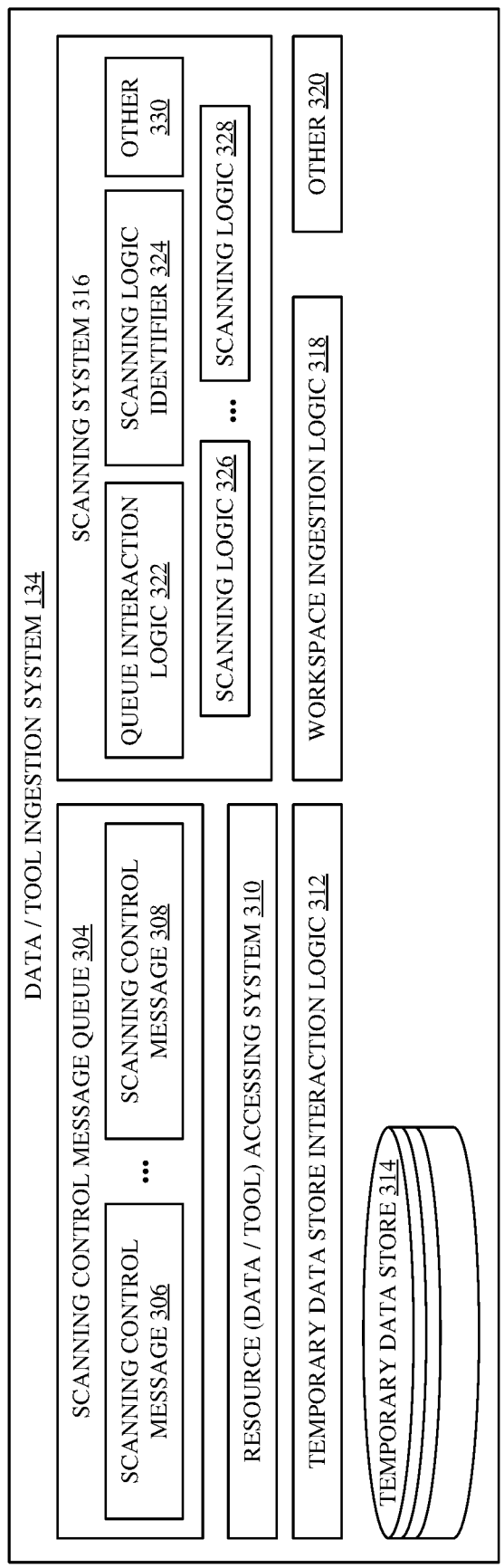
FIG. 6 is a block diagram showing one example of a data/tool ingestion system, in more detail.

FIG. 6 is a block diagram showing one example of data/tool ingestion system 134 in more detail. In the example shown in FIG. 6, data/tool ingestion system 134 illustratively includes scanning control message queue 304 which can include a plurality of different scanning control messages 306-308. System 134 also illustratively includes resource (data/tool) accessing system 310, temporary data store interaction logic 312, temporary data store 314, scanning system 316, workspace ingestion logic 318, and it can include a wide variety of other items 320. Scanning system 316 can include queue interaction logic 322, logic identifier 324, a plurality of different types of scanning logic 326-328, and it can include other items 330.

When request processing system 130 receives a request to ingest data and/or tool into a workspace, client interaction logic 204 provides an indication of this to message queue interaction logic 208. Message queue interaction logic 208 then writes a scanning control message to scanning control message queue 304. The scanning control message identifies the resource (data and/or tool) that has been requested for ingestion into a workspace. Queue interaction logic 322 listens to scanning control message queue 304 and, when a message is present, it obtains the next message from the queue and provides it to logic identifier 324 and resource accessing system 310. Resource accessing system 310 accesses the particular service data source 104-106 where the data and/or tool or logic resides, and obtains that data and/or tool or logic and stores it in temporary data store 314 using temporary data store interaction logic 312.

Logic identifier 324 identifies the particular type of scanning logic 326-328 that is to be used to scan the data and/or tool (or code) that is to be ingested, and that has been temporarily stored in temporary data store 314. By way of example, assume that user 114 has requested that an image of a virtual machine from a particular service be ingested into the workspace. The image of that virtual machine will be accessed by resource accessing system 310 and stored in temporary data store 314 by temporary data store interaction logic 312. Scanning logic identifier 324 identifies the particular set of scanning logic 326-328 that will be used to scan the virtual image to ensure that it is uncorrupted, does not contain malware, etc. For instance, scanning logic identifier 324 may identify a set of forensic tools that will be run on the virtual machine image stored in temporary data store 314 to ensure that it is forensically acceptable to be ingested into the workspace.

The scanning system 316 generates an output to workspace ingestion logic 318, indicative of the results of the scanning operation. If the scanning operation indicates that the data and/or tool can be ingested into the workspace, then workspace ingestion logic 318 retrieves that data and/or tool from temporary data store 314 and ingests it into the workspace where it is to be used in an investigation. However, if the scanning logic indicates that the data and/or tool should not be ingested for some reason, then it indicates this to the control message processing logic instance 224 responsible for handling the data ingestion, and the request processing system interaction logic 242 in that instance provides an indication to the request processing system 130, indicative of the malware, or other problem found by the scanning logic. That can then be surfaced for user 114 or processed in another way.

Figure 7A:
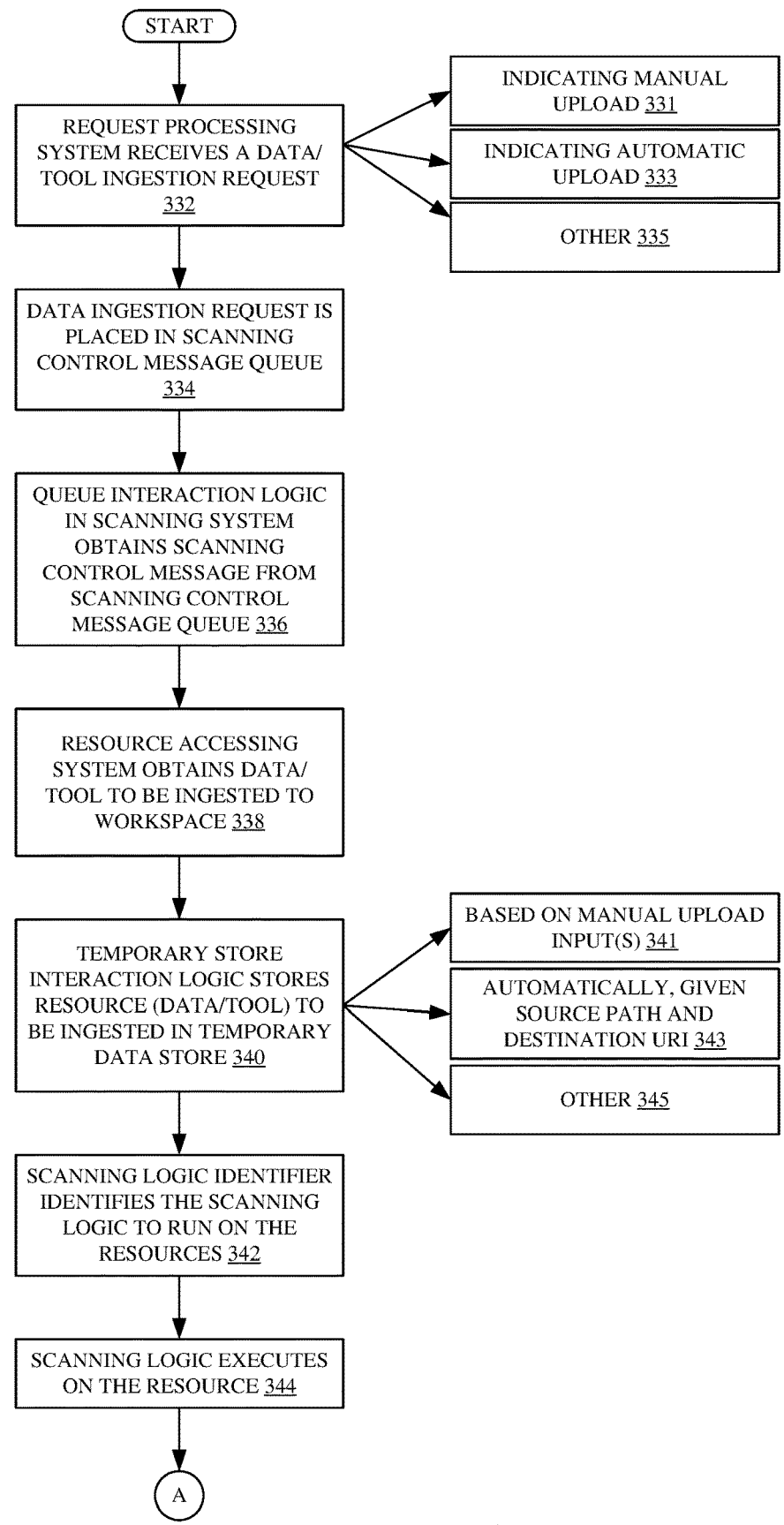
FIGS. 7A and 7B (collectively referred to herein as FIG. 7) show a flow diagram illustrating one example of the operation of the system shown in FIG. 6 in ingesting data and/or tool, into a workspace.
Figure 7B:
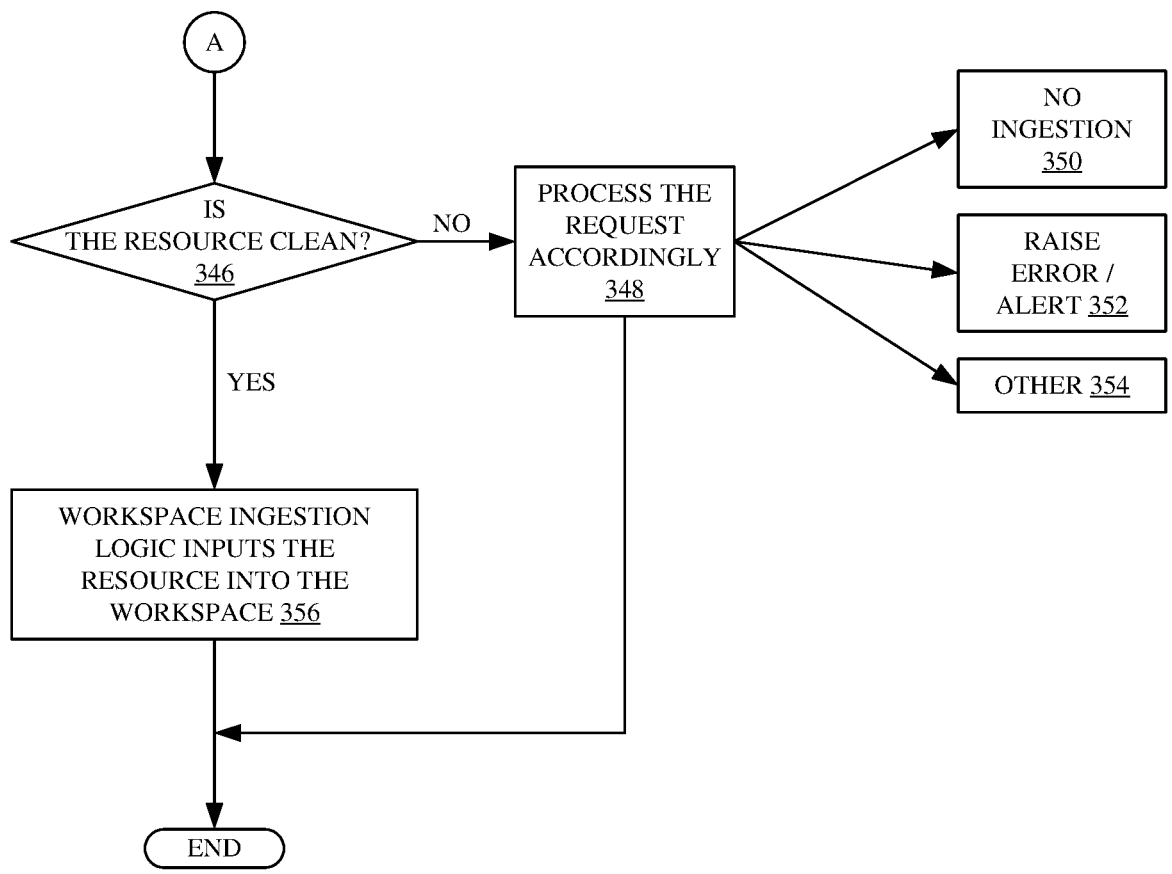

FIGS. 7A and 7B (collectively referred to herein as FIG. 7) show a flow diagram illustrating one example of the operation of data/tool ingestion system 134, in more detail. It is first assumed that the client interaction logic 204 in request processing system 130 receives a request from user 114 (or elsewhere) requesting that data and/or tool or code be ingested into a particular workspace. This is indicated by block 332 in the flow diagram of FIG. 7. The request can indicate whether the data/tool ingestion will be manual as indicated by block 331 or automatic as indicated by block 333. By automated or automatic it is meant that the task can be performed without further involvement, except perhaps to initiate or approve of the task. It can include other items as well as indicated by block 335. Message queue interaction logic 208 then places a scanning control message in scanning control message queue 304 indicating the data that is to be ingested. This is indicated by block 334.

Queue interaction logic 332 in scanning system 316 then obtains the scanning control message from the scanning control message queue 304. This is indicated by block 336. Resource accessing system 310 obtains the data and/or tool to be ingested into the workspace from a particular service data store 104-106. This is indicated by block 338. Temporary data store interaction logic 312 stores that data and/or tool in temporary data store 314 before it is ingested into the workspace. This is indicated by block 340.

This can be done in a number of different ways. For instance, it can be done manually, in which case a user can use upload tools to upload the data/tool(s) to the temporary (e.g., blob) store 314. This is indicated by block 341. The upload can be done automatically as well. For example, the ingestion request may include a source path and a destination URI. Resource accessing system 310 and temporary data store interaction logic 312 use the source path and destination URI, respectively, to access the resource and store it in temporary data store 314. This is indicated by block 343. The data/tool can be uploaded in other ways as well, as indicated by block 345.

Scanning logic identifier 324 then identifies a set of scanning logic 326-328 that is to be run on the resource that has just been stored in temporary data store 314. This is indicated by block 342. The scanning logic that was identified is then executed on the resource in temporary data store 314. This is indicated by block 344 in the flow diagram of FIG. 7. The scanning logic will generate an output indicating the results of the scan. For instance, it may indicate that the resource is clean (suitable for ingestion into the workspace). It may indicate that the resource has a virus or other malware, or some other surreptitious characteristic. Determining whether the resource is clean (e.g., suitable for ingestion into the workspace) is indicated by block 346 in the flow diagram of FIG. 7. If it is not, then the request to ingest that resource is processed accordingly. This is indicated by block 348. For instance, it may be that the resource is simply not ingested to the workspace and the request is dismissed. This is indicated by block 350. It may be that an error or alert is raised for surfacing to user 114. This is indicated by block 352. The request may be processed in a wide variety of other ways as well, and this is indicated by block 354.

If, however, at block 346, it is determined that the resource is clean, then workspace ingestion logic 318 inputs that resource into the workspace for use in the investigation. This is indicated by block 356.

Figure 8:
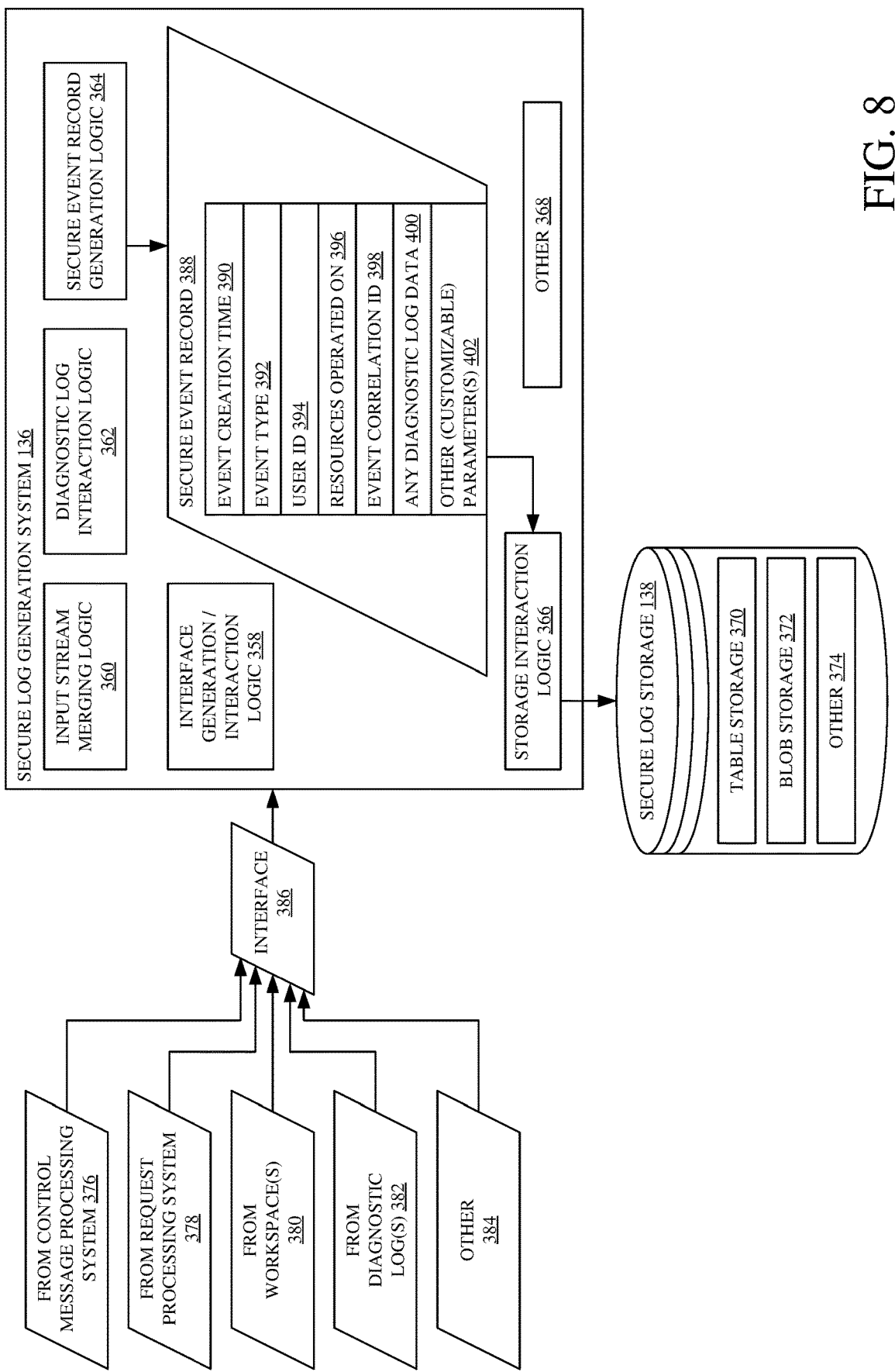
FIG. 8 is a block diagram showing one example of a secure log generation system in more detail.

FIG. 8 is a block diagram showing one example of secure log generation system 136 and secure log storage 138, in more detail. In the example shown in FIG. 8, secure log generation system 136 illustratively includes interface generation/interaction logic 358, input stream merging logic 360, diagnostic log interaction logic 362, secure event record generation logic 364, storage interaction logic 366, and it can include a wide variety of other items 368. Also, in the example shown in FIG. 8, secure log storage 138 can store secure events in table storage 370, blob storage 372, or in a wide variety of other structures as indicated by block 374.

Briefly, by way of example, secure log generation system 136 can receive a wide variety of different types of information, from different parts of secure investigation platform service instance 102 (and from other places) to generate secure event records that it stores in secure log storage 138. For instance, it can receive information from control message processing system 132, as indicated by block 376 in the block diagram of FIG. 8. It can include information from request processing system 130, as indicted by block 378 in the block diagram of FIG. 8. It can include information from workspaces 118-120, as indicated by block 380 in the block diagram of FIG. 8. It can receive information from diagnostic logs in various computing systems, as indicated by block 382. It can receive a wide variety of other information 384, as well.

Interface generation/interaction logic 358 illustratively exposes an interface 386 that can be called by the various systems that provide information to secure log generation system 136. Interface 386 can expose methods or functions that allow secure log generation system 136 to obtain the information needed to generate secure event records. For instance, interface 386 may include methods or functions that receive an event creation time or a time at which the event occurred, an event type indicating what occurred, a user ID identifying a user that requested the event, or was otherwise related to the event, an identifier of resources operated on (such as where data was ingested, it identifies that data, etc.), event correlation identifier that identifies an event correlation which correlates the event that is the subject of the event record to other events, any diagnostic log data corresponding to the event, and it can include a wide variety of other customizable parameters or other parameters as well. Input stream merging logic 360 can merge the various input streams 376-384 either before or after they pass through interface 386.

Diagnostic log interaction logic 362 illustratively interacts with the various components, systems or other items in the secure platform, or from which the secure platform receives information, to obtain diagnostic logs from those systems. In one example, diagnostic log interaction logic 362 is configured to obtain diagnostic log information from relevant systems every time an event is created. In other examples, it obtains diagnostic log information from all relevant systems intermittently, periodically, or based on other criteria, even when other secure log events are not being processed.

Secure event record generation logic 364 generates secure event records for storage and secure log storage 138, based upon the information received. FIG. 8 shows that logic 364 has generated a secure event record 388 that includes an event creation time 390, an event type 392, a user ID 394, an identifier of resources operated on 396, an event correlation ID 398, any relevant diagnostic log data 400, and any of a wide variety of other (e.g., customizable) parameters 402.

Once a secure event record 388 is generated, storage interaction logic 366 stores it in the desired data structure in secure log storage 138. For instance, various types of metadata may be stored in table storage 370. Diagnostic log data may be stored as blob storage 372, etc. These are examples only.

Figure 9:
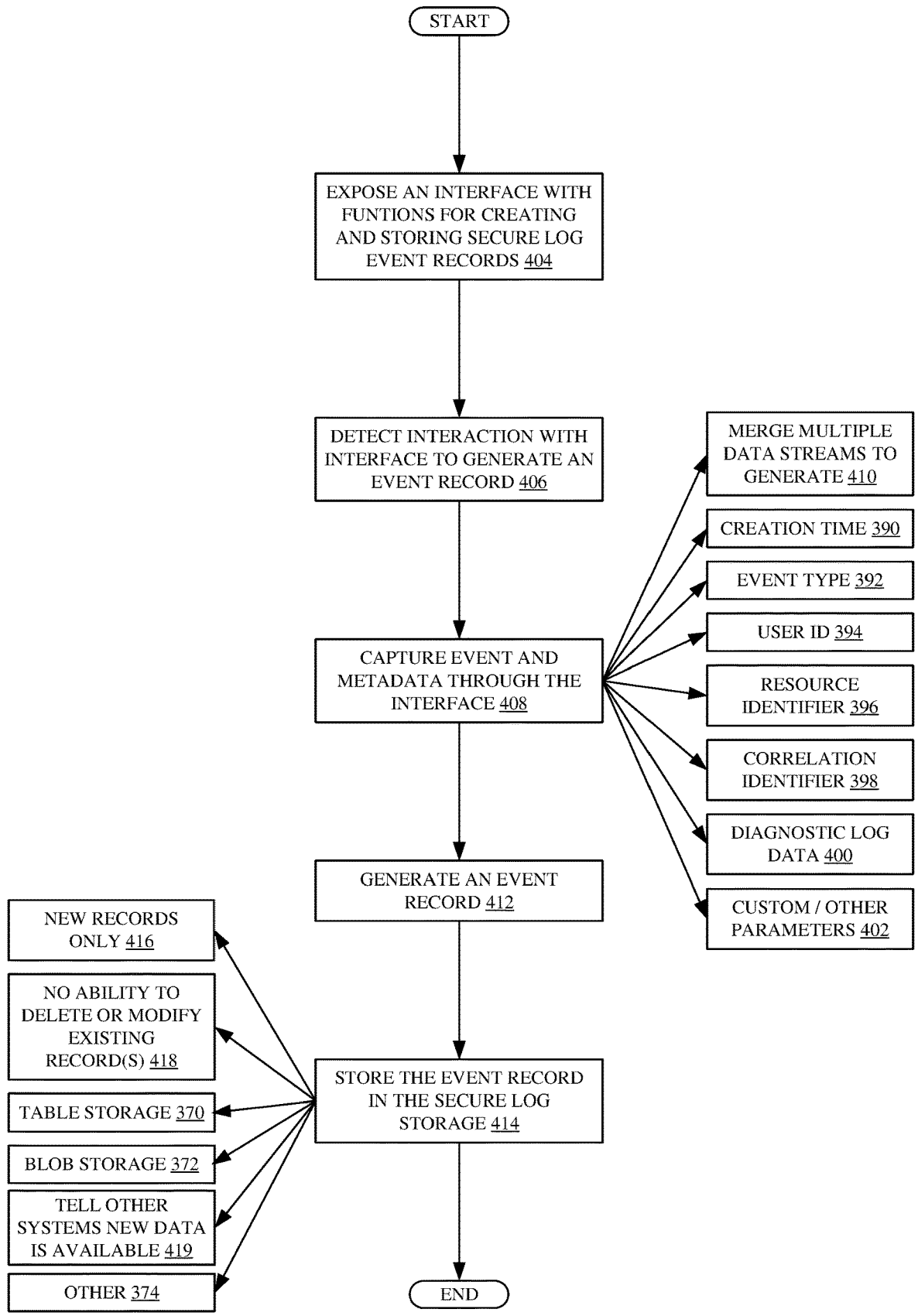
FIG. 9 is a flow diagram showing one example of the operation of the secure log generation system, illustrated in FIG. 8, in storing information to a secure log storage.

FIG. 9 is a flow diagram illustrating one example of the operation of secure log generation system 136, shown in FIG. 8. It is first assumed that interface generation/interaction logic 358 exposes an interface with functions or methods that receive information used in creating and storing secure log event records. This is indicated by block 404 in the flow diagram of FIG. 9. Interface generation/interaction logic 358 then detects interaction with the interface to generate an event record. This is indicated by block 406. By way of example, it may be that certain criteria automatically trigger generation of event records (such as execution of a task within a workspace, ingestion of data into the workspace, scanning data to be ingested, or any of a wide variety of other things). In another example, it may be that a user has requested that an event record be created. Various systems may also take actions that trigger the creation of event records. They can be detected in other ways as well.

Interface generation/interaction logic 358 then captures the event and metadata surrounding the event, through the interface 386. This is indicated by block 408 in the flow diagram of FIG. 9. In doing so, multiple data streams can be merged to generate the event record, as indicated by block 410. The event record can include those items shown in secure event record 388, as also illustrated in the flow diagram of FIG. 9.

When that information is captured, secure event record generation logic 364 generates a corresponding secure event record. This is indicated by block 412 in the flow diagram of FIG. 9. It provides that secure event record to storage interaction logic 366 which stores the secure event record in the secure log storage 138. This is indicated by block 414 in the flow diagram of FIG. 9. In one example, secure log generation system 136 is configured to only generate and store new event records in secure log storage 138. This is indicated by block 416. In this way it has no ability to delete or modify already existing records. This is indicated by block 418. It can store the information in table storage 370, blob storage 372, or in a wide variety of other ways 374. Logic 358 can also generate an output indicating to other systems, components or logic that a new event record is stored in storage 138. This is indicated by block 419 in FIG. 9.

Figure 10:
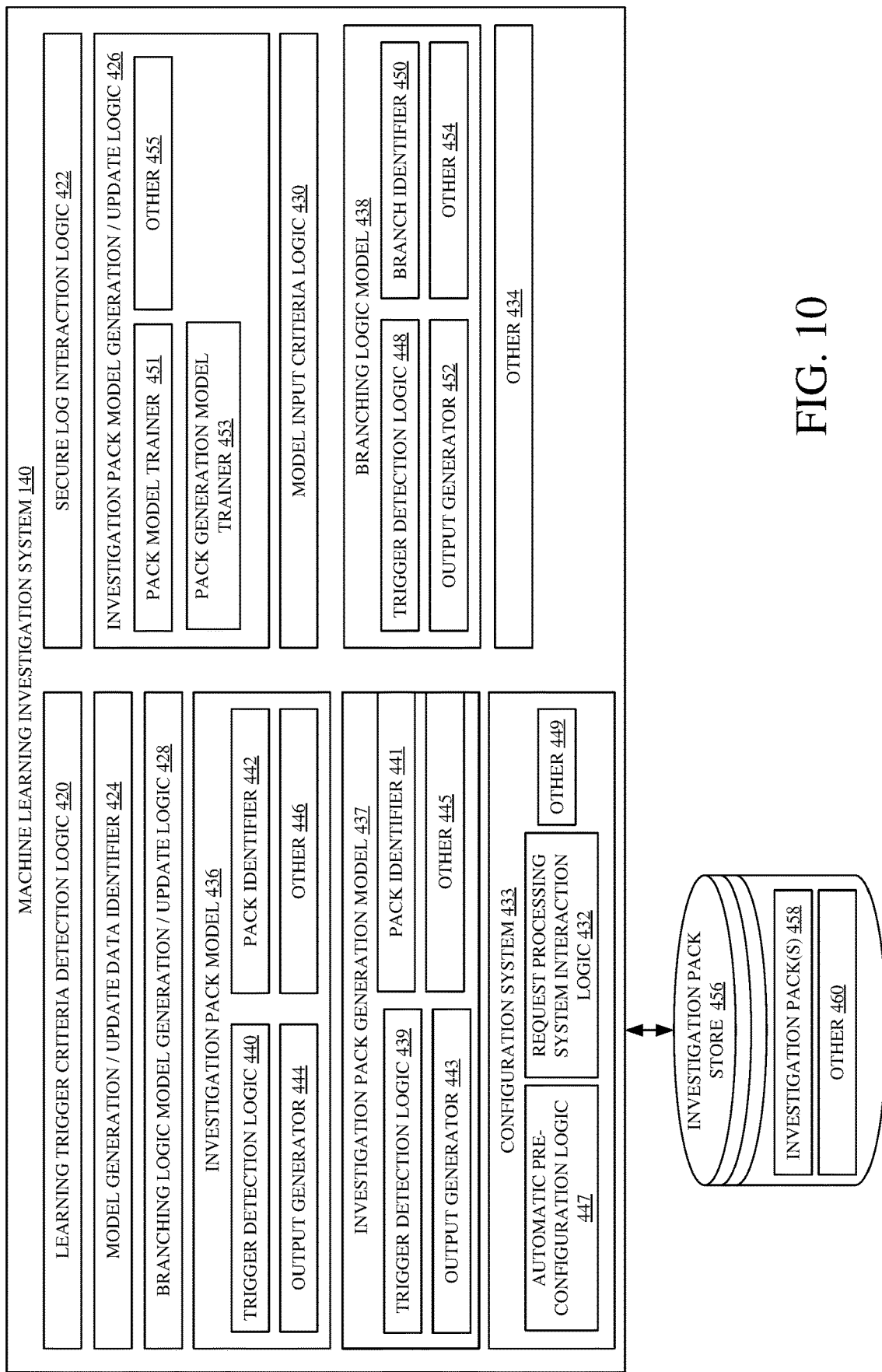
FIG. 10 is a block diagram showing one example of a machine learning investigation system in more detail.

FIG. 10 is a block diagram showing one example of machine learning investigation system 140, in more detail. In the example shown in FIG. 10, system 140 includes learning trigger criteria detection logic 420, secure log interaction logic 422, model generation/update data identifier 424, investigation pack model generation/update logic 426) (which can include pack model trainer 451, pack generation model trainer 453 and it can include other items 455) branching model generation/update logic 428, model input criteria logic 430, configuration system 433 and it can include a wide variety of other items 434. In the example shown in FIG. 10, machine learning investigation system 140 is also shown with one or more investigation pack models 436, investigation pack generation model 437, and branching logic models 438. Investigation pack model 436, includes trigger detection logic 440, pack identifier 442, output generator 444, and it can include other items 446. Investigation pack generation model 437 includes trigger detection logic 439, pack identifier 441, output generator 443 and it can include other items 445. Branching logic model 438 includes trigger detection logic 448, branch identifier 450, output generator 452, and it can include other items 454 as well.

Configuration system 433 can include automatic pre-configuration logic 447 and request processing system interaction logic 432. It can include other items 449 as well.

FIG. 10 also shows that machine learning investigation system 140 interacts with investigation pack store 456. Investigation pack store 456 can store one or more different investigation packs 458, and it can include a wide variety of other items 460.

Briefly, in operation, learning trigger criteria detection logic 420 detects criteria that trigger machine learning investigation system 140 to either perform model training to train (generate or update) a model, or to apply inputs to use a model to identify investigation packs or investigation branching steps. Assume, for the sake of example, that learning trigger criteria detection logic 420 detects criteria indicating that machine learning investigation system 140 is to generate or update a model. This may occur, for instance, when new information is stored to the secure log data store 138. It may occur when an investigation has concluded and a workspace is closed. It may occur under other criteria as well. In that case, secure log interaction logic 422 obtains information from the secure log storage 138 so that it can train one or more models (e.g., generate them or update them) based on the information in secure log storage 138.

Model generation/update data identifier 424 identifies the different types of data that will be used train the models in system 140. For instance, it may identify different sets of data and/or tool that was ingested into a workspace to investigate a particular type of incident, and provide that information to investigation pack model generation/update logic 426. Logic 426 then uses that information to generate and/or update the one or more different investigation pack models 436 and 437.

Model generation/update data identifier 424 may also identify which particular tasks were performed, during an investigation in a workspace. It may provide this information to branching logic model generation/update logic 428. Logic 428 can use the information to train (e.g., create or update) a branching logic model 438.

Once models 436, 437 and 438 are generated, they can be used to assist in incident investigations. For instance, investigation pack generation model 437 can identify different investigation packs 458 that may be useful when investigating incidents of different incident types. The investigation packs 458 can be correlated to characteristics of different incidents so that when incidents having those characteristics occur in the future, the relevant investigation packs 458 can be identified and preloaded into a workspace, as an example, using investigation pack model 436 and configuration system 433.

For instance, trigger detection logic 440 may receive the model input criteria from model input criteria logic 430 indicating that an incident having certain characteristics has been reported and that a workspace has been created for that incident. Pack identifier 442 may identify the one or more investigation packs 458 (if any) that were generated by investigation pack generation model 437 from previous incidents having similar characteristics. Output generator 444 illustratively generates an output indicative of those identified investigation packs and provides it to request processing system interaction logic 432 which can provide it to the request processing system 130 for surfacing to user 114 or another user.

Similarly, when an investigation is underway in a workspace, the tasks that have been performed in that investigation may be identified by model input criteria logic 430 and provided to branching logic model 438. Branching logic model 438 may detect those inputs using trigger detection logic 448 and use branch identifier 450 to identify a next investigative task or step that may be suggested. Output generator 452 generates an output indicative of that next suggested task or branch. Request processing system interaction logic 432 can surface that suggested task or branch to user 114 or to another user.

Figure 11:
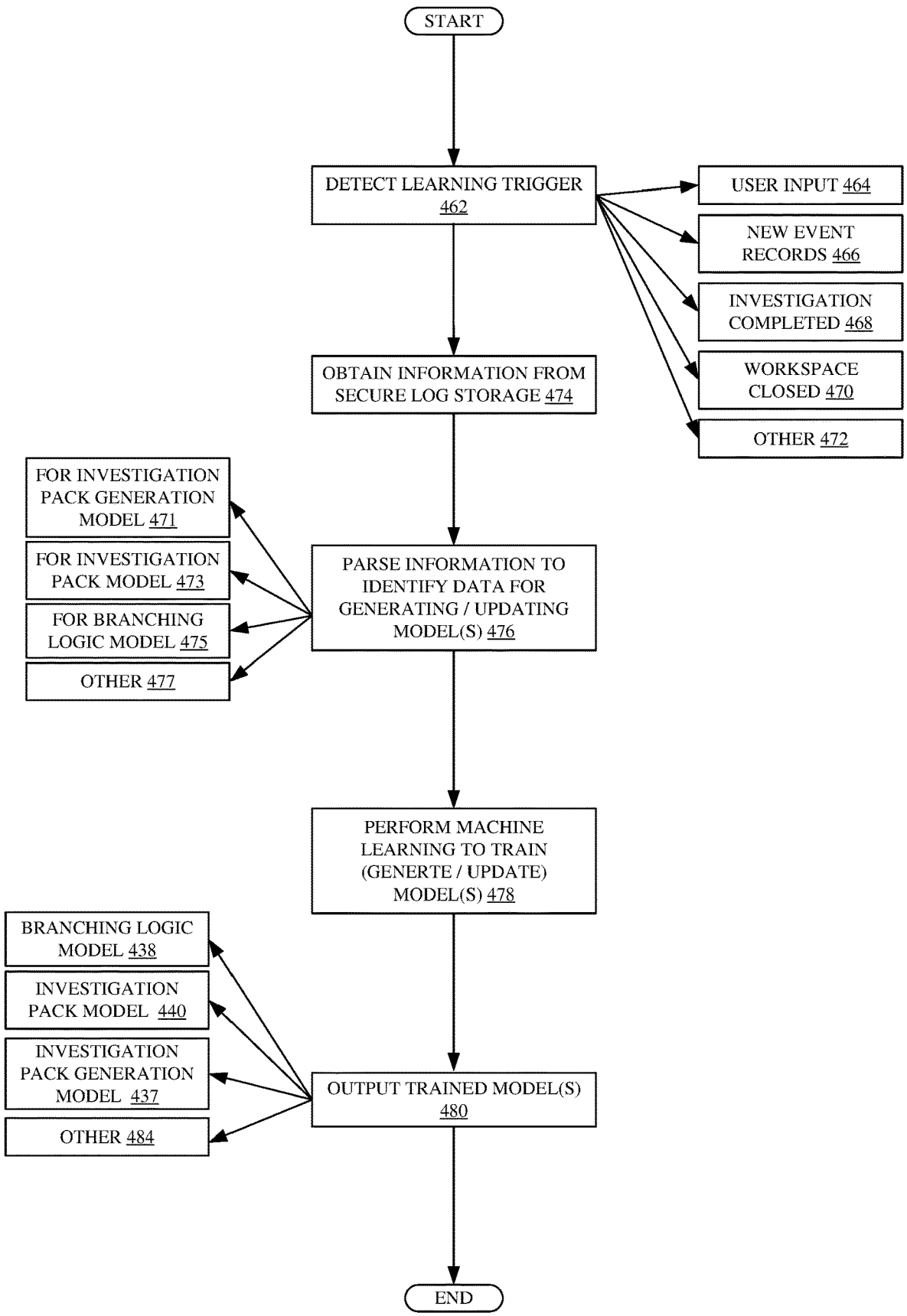
FIG. 11 is a flow diagram illustrating one example of the overall operation of the machine learning investigation system shown in FIG. 10, in generating an investigation pack model and a branching logic model.

FIG. 11 is a flow diagram illustrating one example of the operation of machine learning investigation system 140 in generating investigation pack model 436, investigation pack generation model 437, and/or branching logic model 438. It is first assumed that learning trigger criteria detection logic 420 detects a learning trigger that triggers a learning operation so that system 140 trains (generates or updates) a model. Detecting a learning trigger is indicated by block 462 in the flow diagram of FIG. 11. The trigger can be based on a wide variety of different criteria. For instance, the learning operation can be triggered by a user input indicating that the user wishes the system to train a model. This is indicated by block 464. The learning operation can be triggered by one or more new event records being stored in secure log storage 138 by secure log generation system 136. This is indicated by block 466. The learning may be triggered by an investigation being completed in a workspace 118-120. This is indicated by block 468. It may be triggered by a workspace 118-120 being closed by the control message processing system 132. This is indicated by block 470. The learning operation can be triggered in a wide variety of other ways as well, and this is indicated by block 472.

Secure log interaction logic 422 then obtains information from secure log storage 138. This is indicated by block 474. The information may be the new information that has been added since a last learning operation was performed. It may be all information that has been stored in storage 138 for a predetermined amount of time or a predetermined number of operations. It may be other information as well.

Model generation/update data identifier 424 then parses the retrieved information to identify data for training (generating and/or updating) the models. This is indicated by block 476. For instance, in order to generate or update an investigation pack model 436, it may be that data identifier 424 identifies a certain subset of the data (as indicated by block 473) that was retrieved from secure log storage 138. In order to generate or update an investigation pack generation model 437 (as indicated by block 473), or a branching logic model 438 (as indicated by block 475), it may be that model generation/update data identifier 424 identifies a different subset of data that was retrieved from secure log storage 138. These are examples only and other model training data can be identified, as indicated by block 477.

Then, that information is used to train the models that are to be trained. If investigation pack model 436 is to be trained, then the information is provided to investigation pack model generation/update logic 426 where pack model trainer 451 trains model 436. A machine learning algorithm is run on that information to train (generate or update) model 436. If an investigation pack generation model 437 is to be trained, then the information is provided to pack generation model trainer 453 which trains an investigation pack generation model 437. If a branching logic model 438 is to be trained, then the information obtained by data identifier 424 is provided to branching logic model generation/update logic 428. A machine learning algorithm is run on that data to train (generate or update) a branching logic model 438. Performing machine learning to train a model is indicated by block 478 in the flow diagram of FIG. 11.

The training logic then outputs the trained models 436, 437 and/or 438 for use during investigations. This is indicated by block 480. It can store any preconfigured investigation packs 458, that have been generated by investigation pack generation model 437, in investigation pack store 456. The models can be output in other ways as well, as indicated by block 484.

Figure 11A:
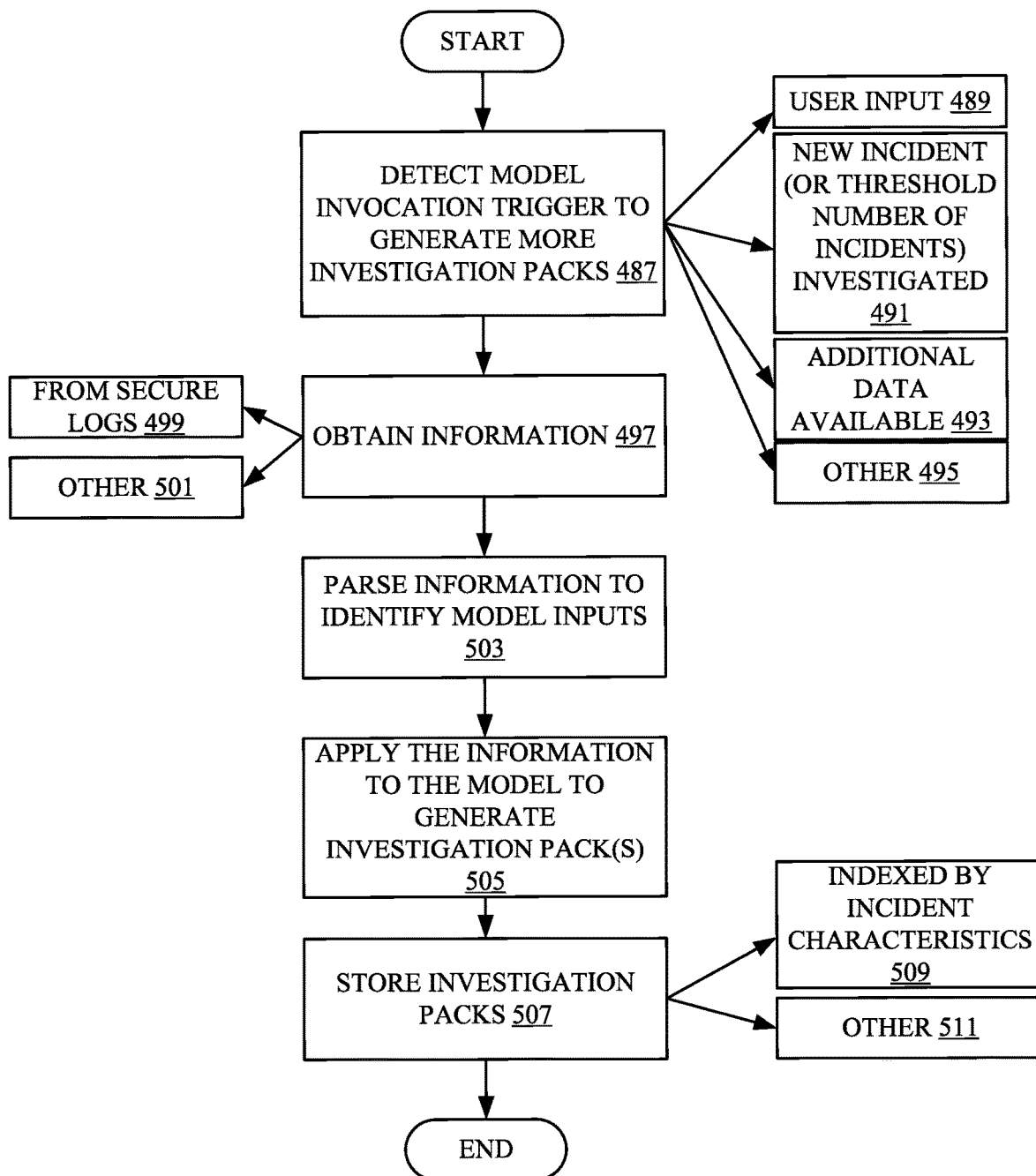
FIG. 11A is a flow diagram illustrating one example of the operation of an investigation model in generating investigation packs.

FIG. 11A is a flow diagram showing indicating one example of how investigation pack generation model 437 can be used. Trigger detection logic 439 first detects model invocation trigger information that is invoking investigation pack generation model 437. This is indicated by block 487 in the flow diagram of FIG. 11A. The trigger information can be based on a user input 489, when user 114 is requesting relevant investigation packs to be generated so that they can be loaded into a workspace. The model may be trigged based upon an incident investigation signal that may be provided by user 114 or another system, indicating that a new incident (or threshold number of incidents) has been investigated. This is indicated by block 491. The model may be triggered based on an indication that additional data is available for use in generating more investigation packs 458. This is indicated by block 493. The model can be invoked by other triggers as well, and this is indicated by block 495.

Model input criteria logic 430 then acquires and provides the information (such as the incident characteristics, that correspond to the incident that has been investigated, or other information) to investigation pack generation model 437. This is indicated by block 497 in the flow diagram of FIG. 11A. The information may be obtained from the secure log 138, as indicated by block 499. The information may be obtained in a wide variety of other ways as well. This is indicated by block 501 in the flow diagram of FIG. 11A.

The information is parsed by model input criteria logic 430 to identify model inputs to model 437. The model inputs include the information that is useful in generating new investigation packs. Parsing the information to identify the model inputs is indicated by block 503 in the flow diagram of FIG. 11A.

Those characteristics are provided as inputs to the investigation pack generation model 437. This is indicated by block 505 in the flow diagram of FIG. 11A. Based on those inputs, pack identifier 441 generates any investigation packs 458 that were helpful in the investigation where they were used. For instance, pack identifier 441 can identify investigative resources (data, tools, code, functionality, etc.) that were used in an investigation, having corresponding characteristics, that was a successful investigation, and output generator 443 generates an output indicative of a new investigation pack 458 that includes or identifies those resources.

Output generator 443 then stores the output, as an investigation pack 458, in investigation pack store 456. This is indicated by block 507 in the flow diagram of FIG. 11A. The packs 458 can be indexed by incident characteristics or a wide variety of other indexing criteria, as indicated by blocks 509 and 511, respectively, in the flow diagram of FIG. 11A.

Figure 12:
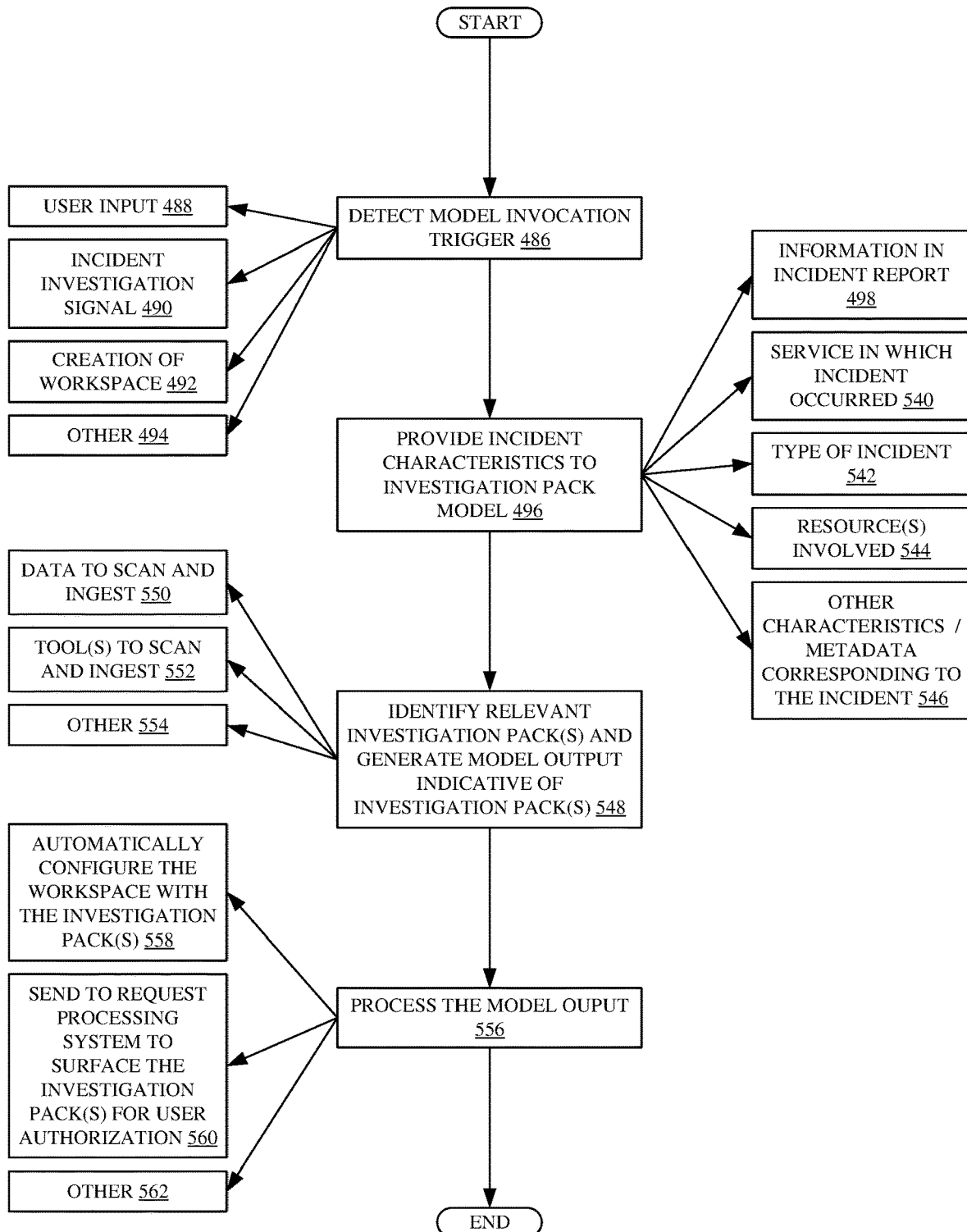
FIG. 12 is a flow diagram illustrating one example of the operation of the machine learning investigation system, illustrated in FIG. 10, in using the investigation pack model.

FIG. 12 is a flow diagram showing one example of how investigation pack model 436 can be used. Trigger detection logic 440 first detects model invocation trigger information that is invoking investigation pack model 436. This is indicated by block 486 in the flow diagram of FIG. 12. The trigger information can be based on a user input 488, when user 114 is requesting relevant investigation packs to be surfaced so that they can be loaded into a workspace. The model may be trigged based upon an incident investigation signal 490 that may be provided by user 114 or another system, indicating that an incident has been reported and is to be investigated. The model may be triggered based on the creation of a workspace as indicated by block 492. For instance, every time a new workspace is created, this may trigger investigation pack model 436 to surface suggested investigation packs for ingestion into the newly created workspace. The model can be invoked by other triggers as well, and this is indicated by block 494.

Model input criteria logic 430 then acquires and provides incident characteristics, that correspond to the incident to be investigated, to investigation pack model 436. This is indicated by block 496 in the flow diagram of FIG. 12. The characteristics of an incident may include a wide variety of different types of information. For instance, an incident may be reported by a user in an incident report which describes the incident. Thus, the incident characteristics may include information in the incident report, as indicated by block 498. The characteristics may include an identifier of the particular service in which the incident occurred. This is indicated by block 540. It may include the type of incident (such as whether it is a problem with a component of a service, or a potential secure incident, etc.). This is indicated by block 542. A characteristic of the incident may include the particular resources involved in the incident, as indicated by block 544. The characteristics may include a wide variety of other characteristics or metadata corresponding to the incident. This is indicated by block 546 in the flow diagram of FIG. 12.

Those characteristics are provided as inputs to the investigation pack model 436. Based on those incidents, pack identifier 442 identifies any relevant investigation packs 458 that may be helpful if ingested into the workspace. It can do this, for instance, by comparing the characteristics of the newly reported incident to the characteristics of incidents from which investigation packs 458 were generated. Model 436 can be a neural network, or any of a wide variety of other classifiers or other types of models that take the incident characteristics as an input and generate an output indicative of one or more different investigation packs that may be useful in the investigation.

Output generator 444 then generates an output indicative of the identified investigation packs. Identifying the relevant investigation packs and generating a model output indicative of those investigation packs is indicated by block 548 in the flow diagram of FIG. 12.

Again, the identified investigation packs may include data to scan and ingest into the workspace, as indicated by block 550. It may include functionality such as forensic tools or other logic, code, or other functionality that may be useful in the investigation, if scanned and ingested in the workspace. This is indicated by block 552. It may include a wide variety of other information, as indicated by block 554.

The model output is then processed by system 140. This is indicated by block 556 in the flow diagram of FIG. 12. For instance, it can provide an output to control message processing system 132 to automatically configure the workspace with the identified investigation packs. This is indicated by block 558. It can use request processing system interaction logic 432 to send the indication of the identified investigation packs to request processing system 130 so that it can be surfaced for user authorization by user 114. This is indicated by block 560. Once authorization is received, this can be indicated to control message processing system 132 which then ingests the investigation packs into the workspace. The model output can be processed in a wide variety of other ways as well, and this is indicated by block 562 in the flow diagram of FIG. 12.

Figure 13:
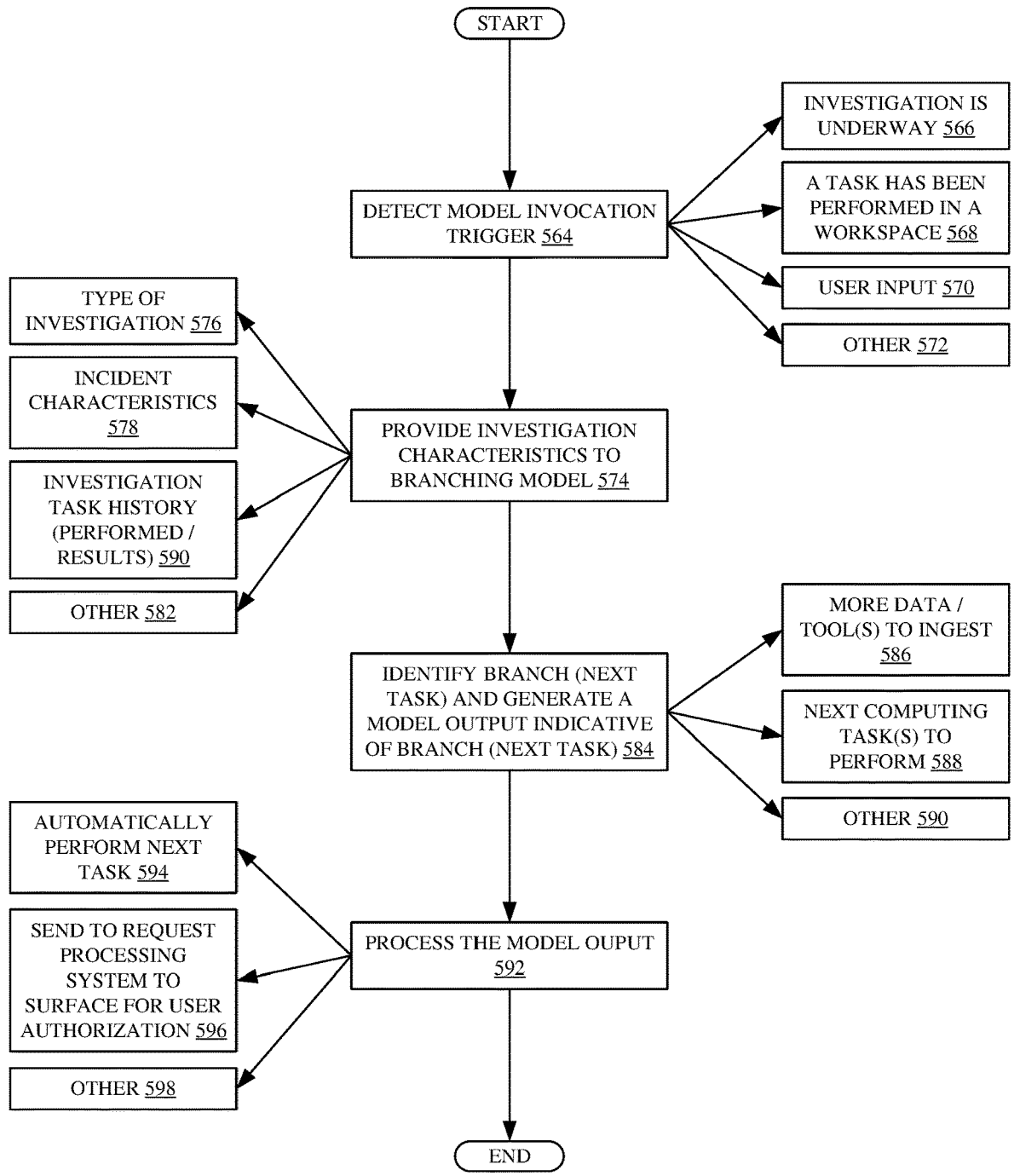
FIG. 13 is a flow diagram showing one example of the operation of the machine learning investigation system illustrated in FIG. 10, in using the branching logic model.

FIG. 13 is a flow diagram showing one example of the machine learning investigation system illustrated in FIG. 10, in using the branching logic model 438.

Trigger detection logic 448 first detects a model invocation trigger invoking the use of model 438. This is indicated by block 564 in the flow diagram of FIG. 13. This may be an input indicating that an investigation is underway (such as that an incident report has been received and user 114 is attempting to investigate it). This is indicated by block 566. It may include information indicating that a task has been performed within a workspace. This is indicated by block 568. It may be a user input requesting branching logic model 438 to suggest a next investigative task or operation. This is indicated by block 570. It may be a wide variety of other trigger criteria as well, and this is indicated by block 572.

Model input criteria logic 430 then obtains the various types of model inputs that may be used by branching logic model 438 in order to identify the next task or step in the investigation. It provides those investigation characteristics to branching logic model 438. This is indicated by block 574 in the flow diagram of FIG. 13. The characteristics may be different, depending on the types of investigation (such as whether it is an investigation into a potential secure breech, into a virus, into a performance issue, etc.). Providing the type of investigation to model 438 is indicated by block 576. The investigation characteristics may include the incident characteristics that described the incident being investigated. This is indicated by block 578. They can include the investigation task history (such as the history of tasks or investigative steps already performed in the workspace and the results of that task history). This is indicated by block 580. The investigation characteristics input into branching logic model 438 can include a wide variety of other characteristics as well, and this is indicated by block 582.

Branch identifier 450 then identifies a branch (e.g., a next task) to perform in the workspace and output generator 452 generates a model output indicative of the branch (next task). This is indicated by block 584 in the flow diagram of FIG. 13. The model output may, for example, identify additional data sets that should be ingested into the workspace or additional tools or other functionality that should be ingested into the workspace. This is indicated by block 586. The model output may identify a next computing task to perform (such as to run a next set of forensic code). This is indicated by block 588. The model output can indicate a wide variety of other things as well, and this is indicated by block 590.

The model output is then processed. This is indicated by block 592 in the flow diagram of FIG. 13. For instance, the model output can be provided to control message processing system 132 which automatically performs the next task identified by the model output. It may automatically ingest additional data or functionality. It may perform a next investigative task within the workspace, etc. Automatically performing the next task is indicated by block 594 in the flow diagram of FIG. 13.

The model output may be sent by request processing system interaction logic 432 to request processing system 130 where it is surfaced for user authorization. This is indicated by block 596. For instance, it may be that the next task is to be authorized by user 114 (or a different user) before it is performed within the workspace. In that case, it can be surfaced by request processing system 130, through user interfaces 112, to user 114, for authorization.

The model output can be processed in a wide variety of other ways as well, and this is indicated by block 598 in the flow diagram of FIG. 13.

It will be noted that the above discussion has described a variety of different systems, components, tools, functionality, and/or logic. It will be appreciated that such systems, components, tools, functionality, and/or logic can be comprised of hardware items (such as processors and associated memory, or other processing components, some of which are described below) that perform the functions associated with those systems, components, tools, functionality, and/or logic. In addition, the systems, components, tools, functionality, and/or logic can be comprised of software that is loaded into a memory and is subsequently executed by a processor or server, or other computing component, as described below. The systems, components, tools, functionality, and/or logic can also be comprised of different combinations of hardware, software, firmware, etc., some examples of which are described below. These are only some examples of different structures that can be used to form the systems, components, tools, functionality, and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 14:
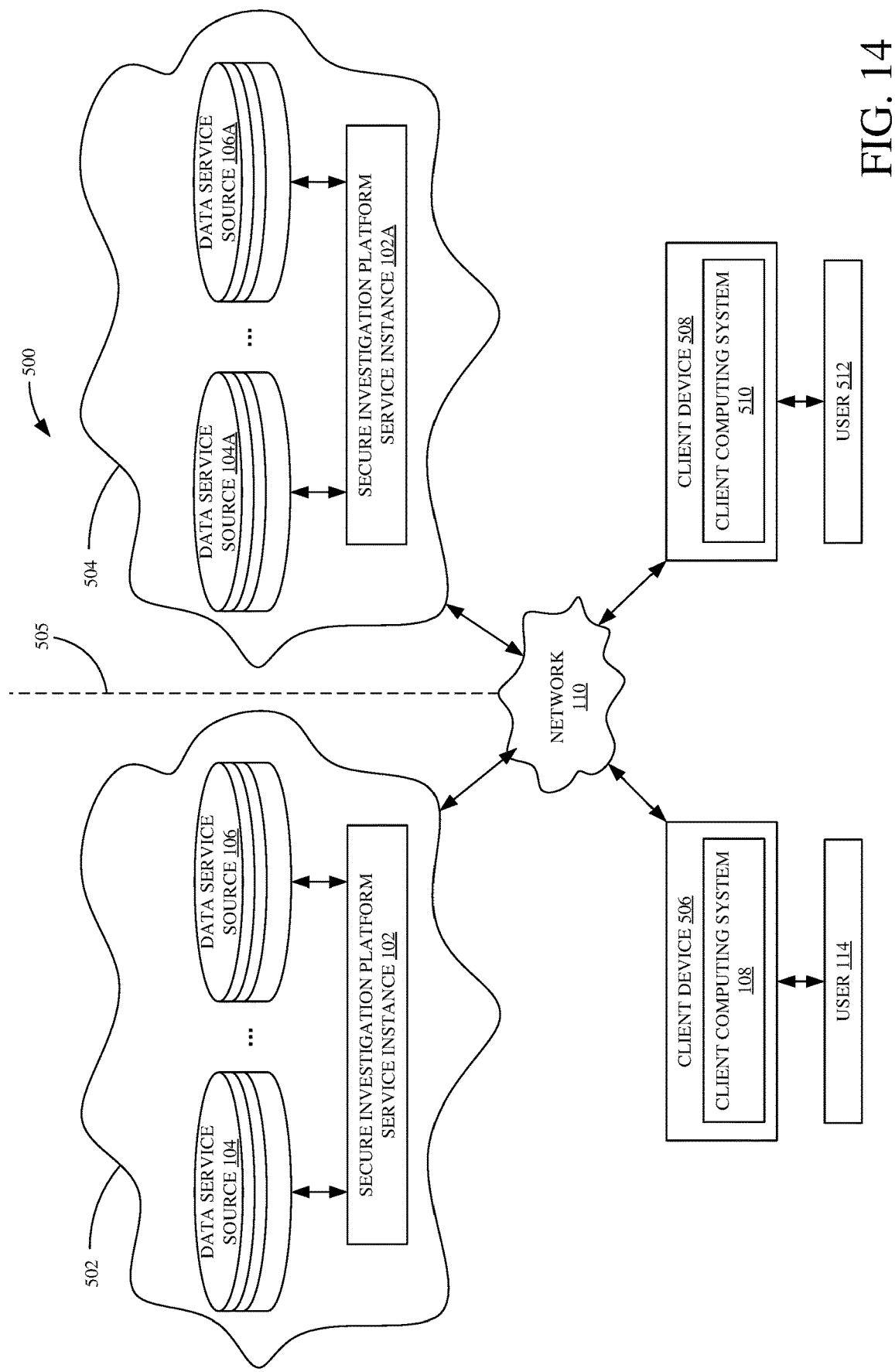
FIG. 14 is a block diagram showing one example of the architecture illustrated in FIG. 1, deployed in a cloud computing architecture.

FIG. 14 is a block diagram showing an architecture 500 in which two sovereign clouds 502 and 504 are separated by a compliance boundary 505. Thus, the data in cloud 502 is stored in a different geographic region than data in cloud 504 and the digital data compliance rules governing the different regions are different. FIG. 14 shows architecture 100 disposed in cloud 502 where services 104 and 106 are in the same sovereign cloud 502 as secure investigation platform service instance 102. Sovereign cloud 504 has services 104A and 106A (they can be similar or different from services 104 and 106) along with a separate instance 102A of the platform. Sovereign cloud 502 can be accessed by user 114 using a client device 506 with client computing system 108. Sovereign cloud 504 can be accessed by user 512 using client device 508 with client computing system 510. These are examples only. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 15:
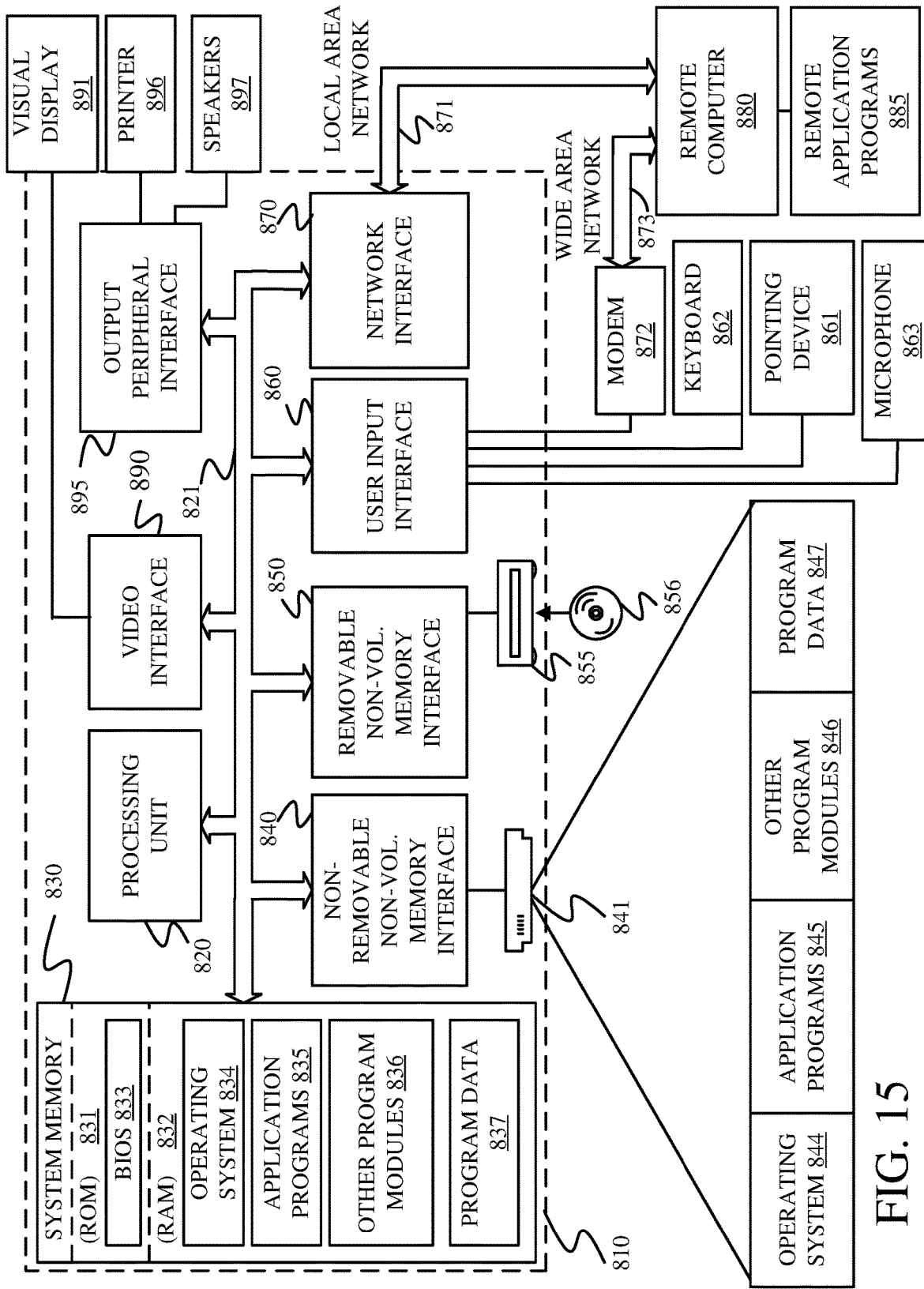
FIG. 15 is a block diagram showing one example of a computing environment that can be used in the architectures shown in the previous figures.

FIG. 15 is one example of a computing environment in which architecture 100, or parts of it, (for example) can be deployed. With reference to FIG. 15, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

Computer 810 can be a general purpose computing device configured to perform as described above. It can also be a secure workstation that provides an administrator with a security hardened workstation environment that has clear application control and various guard features (credential, device, exploit, etc.). Such a workstation may also employ network access control lists to further harden security.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
a request processing system that receives a create workspace request input, identifying a characteristic of an incident to be investigated and being indicative of a user request to create a workspace within a sovereign cloud computing system, the request processing system generating a first control message based on the create workspace request input;
a control message processing system that receives the first control message and generates a workspace within the sovereign cloud computing system based on the first control message;
a machine learned investigation pack suggestion model that identifies an investigation pack, comprising an investigative resource, based on the characteristic of the incident;
an investigation pack output generator that generates an indication of the identified investigation pack; and
a pre-configuration system that inputs the identified investigation pack to the workspace.

Example 2 is the computing system of any or all previous examples wherein the pre-configuration system comprises:
automatic pre-configuration logic configured to automatically load the identified investigation pack into the workspace.

Example 3 is the computing system of any or all previous examples wherein the pre-configuration system comprises:
request processing system interaction logic configured to provide the indication of the identified investigation pack to the request processing system for surfacing, as a suggested investigation pack, for user approval.

Example 4 is the computing system of any or all previous examples and further comprising:
a log configured to store task data indicative of investigative resources used in other workspaces to investigate other incidents having corresponding incident characteristics; and
a machine learning investigation pack generation model configured to access the task data in the log and generate investigation packs based on the task data and store the investigation packs, and the corresponding incident characteristics, in an investigation pack store.

Example 5 is the computing system of any or all previous examples wherein the machine learned investigation pack suggestion model is configured to access the investigation packs in the investigation pack store to identify the identified investigation pack based on the characteristic of the incident and the incident characteristics corresponding to the investigation packs stored in the investigation pack store.

Example 6 is the computing system of any or all previous examples and further comprising:
a machine learning system configured to access the task data in the log and automatically generate and update the investigation pack suggestion model and the investigation pack generation model based on the task data in the log.

Example 7 is the computing system of any or all previous examples wherein the machine learning system comprises:
learning trigger criteria detection logic configured to detect learning criteria indicating that the machine learning system is to train at least one model of the investigation pack generation model or the investigation pack suggestion model; and
investigation pack model training logic configured to train the at least one model based on the task data in the log.

Example 8 is the computing system of any or all previous examples wherein the request processing system receives a perform task request input, identifying a task to perform within the workspace, and generates a second control message indicative of the identified task, and further comprising:
task execution logic configured to execute the task in the workspace based on the second control message, the request processing system being isolated from the workspace and the control message processing system being isolated from user interaction.

Example 9 is the computing system of any or all previous examples and further comprising:
a machine learned branching logic model configured to identify a suggested next task to perform in the workspace based on the characteristic of the incident and the task executed based on the second control message.

Example 10 is the computing system of any or all previous examples wherein the log stores task data indicative of investigative tasks performed in the other workspaces to investigate the other incidents having corresponding incident characteristics and further comprising:
branching logic model training logic configured to train the branching logic model based on the task data stored in the log.

Example 11 is a computing system, comprising:
a request processing system that receives a create workspace request input, identifying a characteristic of an incident to be investigated and being indicative of a user request to create a workspace within a sovereign cloud computing system, the request processing system receiving a perform task request input, identifying a task to perform within the workspace the request processing system generating a first control message based on the create workspace request input and generating a second control message indicative of the identified task;
a control message processing system that receives the first and second control messages and generates a workspace within the sovereign cloud computing system based on the first control message and performs the identified task within the workspace based on the second control message; and
a machine learned branching logic model configured to identify a suggested next task to perform in the workspace based on the characteristic of the incident and the task executed based on the second control message.

Example 12 is the computing system of any or all previous examples and further comprising:
a log configured to store task data indicative of tasks performed in other workspaces to investigate other incidents having corresponding incident characteristics.

Example 13 is the computing system of any or all previous examples and further comprising:
branching logic model training logic configured to train the branching logic model based on the task data stored in the log.

Example 14 is the computing system of any or all previous examples and further comprising:
request processing system interaction logic configured to provide an indication of the suggested next task to the request processing system for surfacing, as a suggested next task, for user approval.

Example 15 is the computing system of any or all previous examples and further comprising:
a machine learned investigation pack suggestion model that identifies an investigation pack, comprising an investigative resource, based on the characteristic of the incident;
an investigation pack output generator that generates an indication of the identified investigation pack; and
a pre-configuration system that inputs the identified investigation pack to the workspace.

Example 16 is the computing system of any or all previous examples wherein the log is configured to store task data indicative of investigative resources used in the other workspaces to investigate the other incidents having corresponding incident characteristics, and further comprising:
a machine learning investigation pack generation model configured to access the task data in the log and generate investigation packs based on the task data and store the investigation packs, and the corresponding incident characteristics, in an investigation pack store.

Example 17 is the computing system of any or all previous examples and further comprising:
a machine learning system configured to access the task data in the log and automatically generate and update the investigation pack suggestion model and the investigation pack generation model based on the task data in the log.

Example 18 is a computer implemented method, comprising:
receiving, at a request processing system in a sovereign cloud computing system, a create workspace request input, identifying a characteristic of an incident to be investigated and being indicative of a user request to create a workspace within the sovereign cloud computing system;
receiving, at the request processing system, a perform task request input, identifying a task to perform within the workspace;
generating a first control message based on the create workspace request input and generating a second control message indicative of the identified task;
generating, with a control message processing system in the sovereign cloud computing system, a workspace within the sovereign cloud computing system based on the first control message;
performing the identified task within the workspace based on the second control message;
using a machine learned branching logic model configured to identify a suggested next task to perform in the workspace based on the characteristic of the incident and the task executed based on the second control message;
generating a suggested next task output indicative of the suggested next task; and
providing the suggested next task output to the request processing system for surfacing to the user.

Example 19 is the computer implemented method of any or all previous examples, further comprising:
storing task data indicative of tasks performed in other workspaces to investigate other incidents having corresponding incident characteristics; and
training the branching logic model based on the task data stored in the log.

Example 20 is the computer implemented method of any or all previous examples and further comprising:
identifying an investigation pack, comprising an investigative resource, based on the characteristic of the incident; and
automatically inputting the identified investigation pack to the workspace.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computing system comprising:
at least one processor; and memory storing instructions executable by the at least one processor, wherein the instructions, when executed, cause the computing system to:
obtain task data indicative of at least one investigative resource used in a first workspace to investigate a first incident having a corresponding incident characteristic;
generate, by a machine learning investigation pack generation model based on the task data, an investigation pack comprising the at least one investigative resource; and
store, in an investigation pack store, the investigation pack and the corresponding incident characteristic;
receive a request that identifies a characteristic of a second incident to be investigated within a cloud computing system;
generate a second workspace within the cloud computing system based on the request;
select the investigation pack in the investigation pack store based on the characteristic of the second incident relative to the corresponding incident characteristic corresponding to the investigation pack stored in the investigation pack store; and
input the investigation pack to the second workspace.

2. The computing system of claim 1, wherein the instructions, when executed, cause the computing system to:
automatically load the investigation pack into the second workspace.

3. The computing system of claim 1, wherein the instructions, when executed, cause the computing system to:
generate a user interface that provides the investigation pack as a suggested investigation pack;
input the investigation pack to the second workspace in response to user input that approves the suggested investigation pack.

4. The computing system of claim 1, wherein the instructions, when executed, cause the computing system to:
store, in a log, task data indicative of investigative resources used in other workspaces to investigate other incidents having corresponding incident characteristics;
generate a plurality of investigation packs based on the task data; and
store the plurality of investigation packs, and the corresponding incident characteristics, in the investigation pack store.

5. The computing system of claim 4, wherein the instructions, when executed, cause the computing system to:
access the plurality of investigation packs in the investigation pack store; and
select a particular investigation pack, from the plurality of investigation packs; based on the corresponding incident characteristic of the first incident and the corresponding incident characteristics corresponding to the plurality of investigation packs stored in the investigation pack store.

6. The computing system of claim 5, wherein the instructions, when executed, cause the computing system to:
in response to a learning criterion, train the machine learning investigation pack generation model based on the task data in the log.

7. The computing system of claim 4, wherein the instructions, when executed, cause the computing system to:
receive, using a request processing system, a perform task request input that identifies a task to perform within the second workspace;
generate a control message indicative of the task; and
execute the task in the second workspace based on the control message, the request processing system being isolated from the second workspace.

8. The computing system of claim 7, wherein the instructions, when executed, cause the computing system to:
identify, by a machine learned branching logic model, a suggested next task to perform in the second workspace based on the characteristic of the first incident and the task executed based on the control message.

9. The computing system of claim 8 wherein the log stores task data indicative of investigative tasks performed in other workspaces to investigate other incidents having corresponding incident characteristics, wherein the instructions, when executed, cause the computing system to:
train the machine learned branching logic model based on the task data stored in the log.

10. A computer-implemented method comprising:
obtaining task data indicative of at least one investigative resource used in a first workspace to investigate a first incident having a corresponding incident characteristic;
generating, by a machine learning investigation pack generation model based on the task data, an investigation pack comprising the at least one investigative resource; and
storing, in an investigation pack store, the investigation pack and the corresponding incident characteristic;
receiving a request that identifies a characteristic of a second incident to be investigated within a cloud computing system;
generating a second workspace within the cloud computing system based on the request;
selecting the investigation pack in the investigation pack store based on the characteristic of the second incident relative to the corresponding incident characteristic corresponding to the investigation pack stored in the investigation pack store; and
inputting the investigation pack to the second workspace.

11. The computer-implemented method of claim 10, and further comprising:
automatically loading the investigation pack into the second workspace.

12. The computer-implemented method of claim 10, and further comprising:
generating a user interface that provides the investigation pack as a suggested investigation pack;
inputting the investigation pack to the second workspace in response to user input that approves the suggested investigation pack.

13. The computer-implemented method of claim 10, and further comprising:
storing, in a log, task data indicative of investigative resources used in other workspaces to investigate other incidents having corresponding incident characteristics;
generating a plurality of investigation packs based on the task data; and
storing the plurality of investigation packs, and the corresponding incident characteristics, in the investigation pack store.

14. The computer-implemented method of claim 13, and further comprising:
accessing the plurality of investigation packs in the investigation pack store; and
selecting a particular investigation pack, from the plurality of investigation packs; based on the characteristic of the first incident and the corresponding incident characteristics corresponding to the plurality of investigation packs stored in the investigation pack store.

15. The computer-implemented method of claim 14, and further comprising:

in response to a learning criterion, training the machine learning investigation pack generation model based on the task data in the log.

16. The computer-implemented method of claim 13, and further comprising:

receiving, using a request processing system, a perform task request input that identifies a task to perform within the second workspace;

generating a control message indicative of the task; and executing the task in the second workspace based on the control message, the request processing system being isolated from the second workspace.

17. The computer-implemented method of claim 16, and further comprising:

identifying, by a machine learned branching logic model, a suggested next task to perform in the second workspace based on the characteristic of the first incident and the task executed based on the control message.

18. The computer-implemented method of claim 17 wherein the log stores task data indicative of investigative tasks performed in other workspaces to investigate other incidents having corresponding incident characteristics, and further comprising:

training the machine learned branching logic model based on the task data stored in the log.

19. A cloud computing system comprising:

at least one processor; and memory storing computer executable instructions which, when executed by the at least one processor, cause the cloud computing system to:

receive a create workspace request input indicative of a user request to create a workspace;

process the user request using a request processing system that generates a first control message based on the create workspace request input;

generate a second control message corresponding to a task within the workspace;

generate the workspace within the cloud computing system based on the first control message using a control message processing system; and execute the task in the workspace based on the second control message, the request processing system being isolated from the workspace and the control message processing system being isolated from user interaction.

20. The cloud computing system of claim 19, when executed by the at least one processor, cause the cloud computing system to:

receive a data ingestion request input indicative of a requested resource to be ingested into the workspace;

generate a scanning control message based on the data ingestion request input;

receive a perform task request input indicative of a user request to perform the task within the workspace; and generate the second control message, corresponding to the task, based on the perform task request input.

* * * * *